(12) United States Patent
Li et al.

(10) Patent No.: US 11,892,691 B2
(45) Date of Patent: Feb. 6, 2024

(54) HERMETIC OPTICAL FIBER ALIGNMENT ASSEMBLY HAVING INTEGRATED OPTICAL ELEMENT

(71) Applicant: Senko Advanced Components, Inc., Hudson, MA (US)

(72) Inventors: Shuhe Li, Pasadena, CA (US); Robert Ryan Vallance, Newbury Park, CA (US); Michael K. Barnoski, Pacific Palisades, CA (US); King-Fu Hii, Camarillo, CA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 16/933,899

(22) Filed: Jul. 20, 2020

(65) Prior Publication Data

US 2021/0072471 A1 Mar. 11, 2021

Related U.S. Application Data

(63) Continuation of application No. 15/135,466, filed on Apr. 21, 2016, now Pat. No. 10,718,914, which is a continuation of application No. 13/861,273, filed on Apr. 11, 2013, now abandoned, which is a
(Continued)

(51) Int. Cl.
*G02B 6/42* (2006.01)
*G02B 6/38* (2006.01)

(52) U.S. Cl.
CPC ......... *G02B 6/4248* (2013.01); *G02B 6/3838* (2013.01); *G02B 6/3885* (2013.01); *G02B 6/428* (2013.01); *G02B 6/4214* (2013.01); *G02B 6/4219* (2013.01); *G02B 6/4246* (2013.01); *G02B 6/4253* (2013.01); *G02B 6/4263* (2013.01); *G02B 6/4292* (2013.01); *G02B 6/4295* (2013.01); *G02B 6/3833* (2013.01); *G02B 6/3839* (2013.01);
(Continued)

(58) Field of Classification Search
CPC .. G02B 6/4233; G02B 6/4249; G02B 6/3839; G02B 6/4295; G02B 6/3838; G02B 6/4248; G02B 6/4214; G02B 6/4246
See application file for complete search history.

(56) References Cited

U.S. PATENT DOCUMENTS

| 4,945,400 A | * | 7/1990 | Blonder | G02B 6/4277 |
| | | | | 257/116 |
| 5,479,540 A | * | 12/1995 | Boudreau | G02B 6/4246 |
| | | | | 398/164 |

(Continued)

*Primary Examiner* — Sung H Pak
*Assistant Examiner* — Hoang Q Tran

(57) ABSTRACT

A hermetic optical fiber alignment assembly includes a ferrule portion having a plurality of grooves receiving the end sections of optical fibers, wherein the grooves define the location and orientation of the end sections with respect to the ferrule portion. The assembly includes an integrated optical element for coupling the input/output of an optical fiber to the opto-electronic devices in the opto-electronic module. The optical element can be in the form of a structured reflective surface. The end of the optical fiber is at a defined distance to and aligned with the structured reflective surface. The structured reflective surfaces and the fiber alignment grooves can be formed by stamping.

20 Claims, 15 Drawing Sheets

Related U.S. Application Data continuation-in-part of application No. 13/786,448, filed on Mar. 5, 2013, now abandoned.

(60) Provisional application No. 61/699,125, filed on Sep. 10, 2012, provisional application No. 61/623,027, filed on Apr. 11, 2012, provisional application No. 61/606,885, filed on Mar. 5, 2012.

(52) U.S. Cl.
CPC .......... *G02B 6/3877* (2013.01); *G02B 6/4249* (2013.01); *Y10T 29/49* (2015.01)

(56) References Cited

U.S. PATENT DOCUMENTS

| | | | | |
|---|---|---|---|---|
| 5,896,481 A | * | 4/1999 | Beranek | G02B 6/4248 385/91 |
| 2006/0233497 A1 | * | 10/2006 | Hoshino | G02B 6/423 385/88 |

* cited by examiner

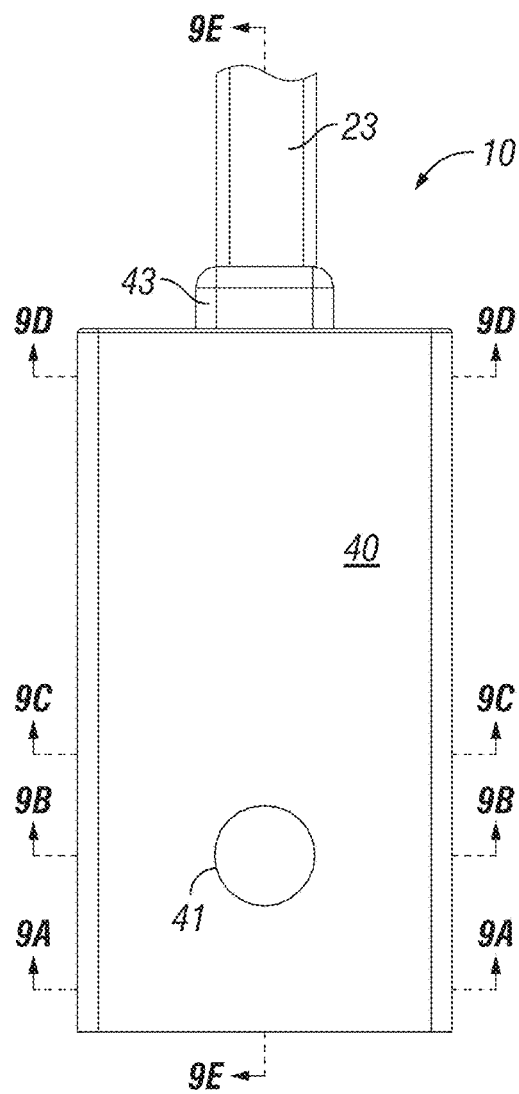 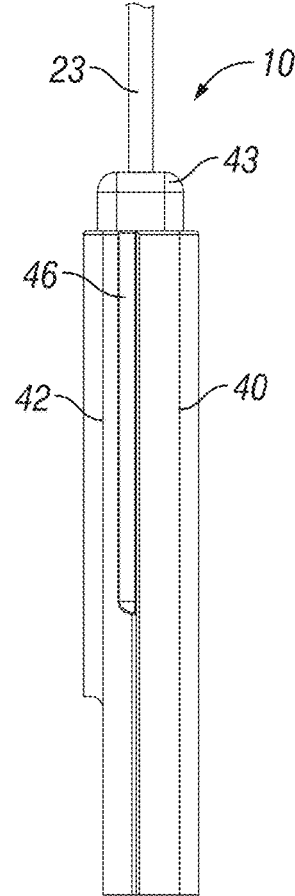
FIG. 5A  FIG. 5B
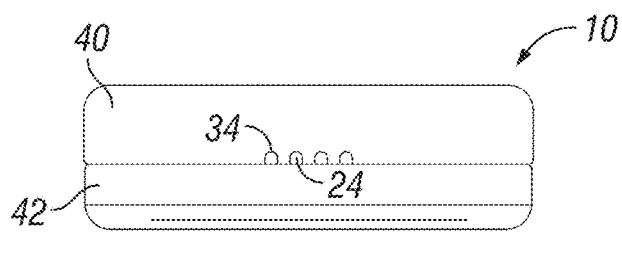 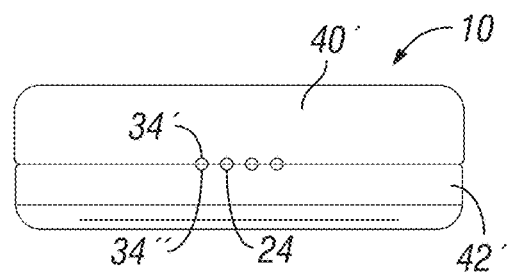
FIG. 5C  FIG. 5D

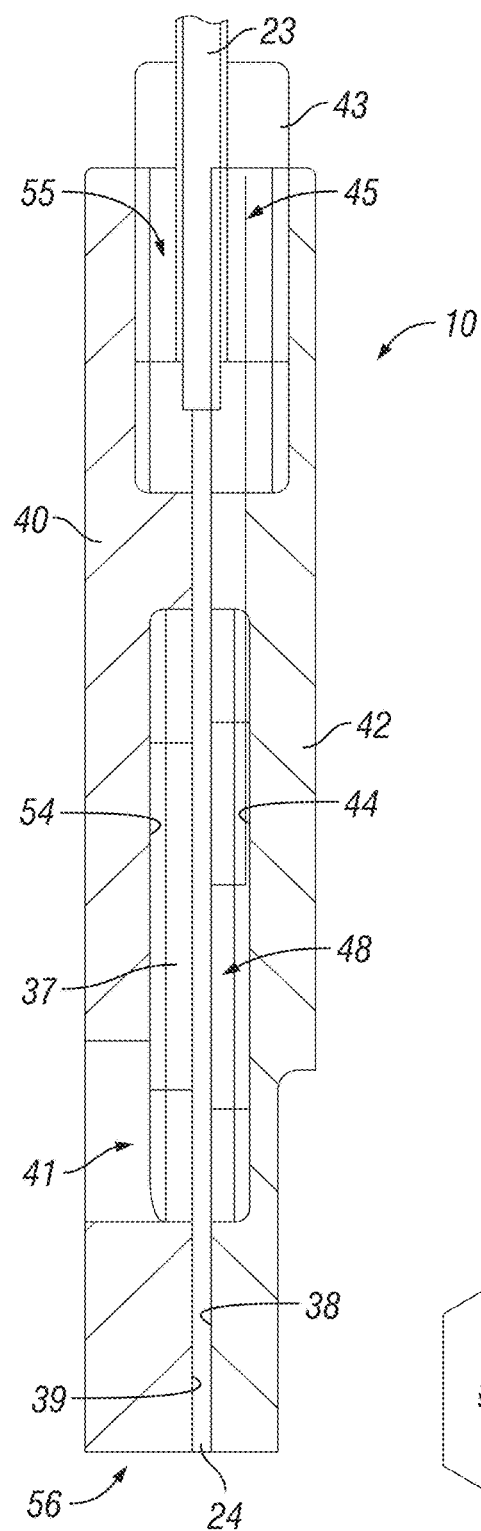
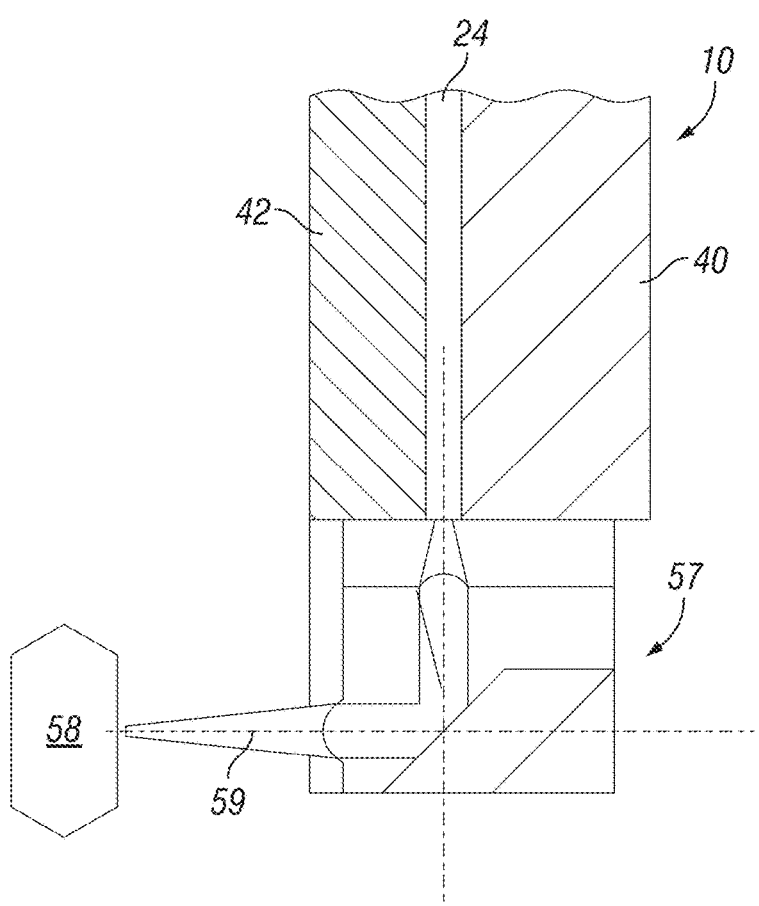
FIG. 9E
FIG. 10C

HERMETIC OPTICAL FIBER ALIGNMENT ASSEMBLY HAVING INTEGRATED OPTICAL ELEMENT

PRIORITY CLAIM

This application is a continuation of U.S. patent application Ser. No. 15/135,466 filed on Apr. 21, 2016, now U.S. Pat. No. 10,718,914, which is a continuation of U.S. patent application Ser. No. 13/861,273 filed on Apr. 11, 2013, now abandoned, which (a) claims the priority of U.S. Provisional Patent Application No. 61/623,027 filed on Apr. 11, 2012; (b) claims the priority of U.S. Provisional Patent Application No. 61/699,125 filed on Sep. 10, 2012; and (c) is a continuation-in-part of U.S. patent application Ser. No. 13/786,448 filed on Mar. 5, 2013, now abandoned, which claims the priority of U.S. Provisional Patent Application No. 61/606,885 filed on Mar. 5, 2012. These applications are fully incorporated by reference as if fully set forth herein. All publications noted below are fully incorporated by reference as if fully set forth herein.

BACKGROUND OF THE INVENTION

1. Field of the Invention

The present invention relates to optical fiber ferrule structures, in particular a hermetic optical fiber alignment assembly including a ferrule for aligning optical fibers.

2. Description of Related Art

Given the increasing bandwidth requirements for modern day data transmission (e.g., for high definition video data), fiber optic signal transmissions have become ubiquitous for communicating data. Optical signals are transmitted over optical fibers, through a network of optical fibers and associated connectors and switches. The optical fibers demonstrate a significantly higher bandwidth data transmission capacity and lower signal losses compared to copper wires for a given physical size/space.

In fiber optic signal transmission, conversions between optical signals and electrical signals take place beyond the terminating end of the optical fiber. Specifically, at the output end of an optical fiber, light from the optical fiber is detected by a transducing receiver and converted into an electrical signal for further data processing downstream (i.e., optical-to-electrical conversion). At the input end of the optical fiber, electrical signals are converted into light to be input into the optical fiber by a transducing transmitter (i.e., electrical-to-optical conversion).

The opto-electronic devices (receiver and transmitter and associated optical elements and electronic hardware) are contained in an opto-electronic module or package. The optical fiber is introduced from outside the housing of the opto-electronic module, through an opening provided in the housing wall. The end of the optical fiber is optically coupled to the opto-electronic devices held within the housing. A feedthrough element supports the portion of the optical fiber through the wall opening. For a variety of applications, it is desirable to hermetically seal the opto-electronic devices within the housing of the opto-electronic module, to protect the components from corrosive media, moisture and the like. Since the package of the opto-electronic module must be hermetically sealed as whole, the feedthrough element must be hermetically sealed, so that the electro-optic components within the opto-electronic module housing are reliably and continuously protected from the environment.

Heretofore, hermetic feedthrough is in the form of a cylindrical sleeve defining a large clearance through which a section of the optical fiber passes. The optical fiber extends beyond the sleeve into the opto-electronic module. The end of the optical fiber is terminated in a ferrule (separate from the sleeve) that is aligned with the opto-electronic devices provided therein. A sealing material such as epoxy is applied to seal the clearance space between the optical fiber and inside wall of the sleeve. The sleeve is inserted into the opening in the opto-electronic module housing, and the opening is sealed, typically by soldering the exterior wall of the sleeve to the housing. The outside wall of the sleeve may be gold plated to facilitate soldering and improve corrosion resistance.

Given the large clearance between the sleeve and the optical fiber and the use of epoxy to seal such clearance (i.e., a layer of epoxy between the external fiber wall and the inside wall of the sleeve), the sleeve does not support the optical fiber with any positional alignment with respect to the sleeve. Given the sealing material provides stress and strain relief for the section of optical fiber held therein, the brittle fiber does not easily break during handling. The sleeve essentially functions as a grommet or conduit that is sealed to the opto-electronic module housing and that passes through the optical fiber in a hermetic seal within the sleeve. As noted below, the end of the optical fiber needs to be aligned to the opto-electronic devices to within acceptable tolerances by means of a ferrule.

To optically couple the input/output of the optical fiber to the opto-electronic devices in the opto-electronic module, optical elements such as lenses and mirrors are required to collimate and/or focus light from a light source (e.g., a laser) into the input end of the optical fiber, and to collimate and/or focus light from the output end of the optical fiber to the receiver. To achieve acceptable signal levels, the end of the optical fiber must be precisely aligned at high tolerance to the transmitters and receivers, so the optical fiber are precisely aligned to the optical elements supported with respect to the transmitters and receivers. In the past, given the internal optical elements and structures needed to achieve the required optical alignments at acceptable tolerance, coupling structures including a connection port is provided within the hermetically sealed opto-electronic module housing to which a ferrule terminating the end of the optical fiber is coupled. The transmitters and receivers and associated optical elements and connection structures are therefore generally bulky, which take up significant space, thereby making them not suitable for use in smaller electronic devices. Heretofore, opto-electronic modules containing transmitters and receivers are generally quite expensive and comparatively large in size for a given port count. Given optical fibers are brittle, and must be handled with care during and after physical connection to the coupling structure within the opto-electronic module and to avoid breakage at the feedthrough sleeve. In the event of breakage of the optical fiber, it has been the industry practice to replace the entire opto-electronic module to which the hermetic optical fiber feedthrough is soldered. The connection and optical alignment of the optical fibers with respect to the transmitters and receivers must be assembled and the components must be fabricated with sub-micron precision, and should be able to be economical produced in a fully automated, high-speed process.

The above noted drawbacks of existing fiber optic data transmission are exacerbated in multi-channel fiber transmission.

OZ Optics Ltd produces multi-fiber hermetically sealable patchcord with glass solder having multiple optical fibers passing through a sleeve, with the optical fibers extending beyond the sleeve, with the ends of the optical fibers held in an alignment ferrule separate from the sleeve. OZ Optics Ltd further produces a multi-fiber hermetically sealable patchcord with metal solder, in which the optical fibers are coated with a metal (metalized fibers). The optical fibers are terminated with a silicon ferrule that is supported within a sleeve, which is a component separate from the ferrule. The outside wall of the sleeve is gold plated for sealing to an opto-electronic module housing. However, these multi-fiber hermetic feedthrough configurations do not appear to resolve the drawbacks of the prior art noted above, and introduce additional complexity and cost at least from a manufacturability perspective.

What is needed is an improved hermetic optical fiber alignment assembly, which improves optical alignment, manufacturability, ease of use, functionality and reliability at reduced costs.

SUMMARY OF THE INVENTION

The present invention provides an improved hermetic optical fiber alignment assembly, which improves optical alignment, manufacturability, ease of use, functionality and reliability at reduced costs, thereby overcoming many of the drawbacks of the prior art structures.

In one aspect, the present invention provides a hermetic optical fiber alignment assembly, comprising: a first ferrule portion having a first surface provided with a plurality of grooves receiving at least the end sections of a plurality of optical fibers, wherein the grooves define the location and orientation of the end sections with respect to the first ferrule portion; a second ferrule portion having a second surface facing the first surface of the first ferrule, wherein the first ferrule portion is attached to the second ferrule portion with the first surface against the second surface, wherein a cavity is defined between the first ferrule portion and the second ferrule portion, wherein the cavity is wider than the grooves, and wherein a suspended section of each optical fiber is suspended in the cavity, and wherein the cavity is sealed with a sealant. The sealant extends around the suspended sections of the optical fibers within the cavity. At least one the first surface of the first ferrule portion is provided with a well defining a first pocket in the first ferrule portion, wherein the first pocket and the second ferrule section together define the cavity. An aperture is provided in at least one of the first ferrule portion and the second ferrule portion, exposing the cavity, wherein the sealant is feed through the aperture.

In another aspect of the present invention, the hermetic optical fiber alignment assembly provides optical alignment and a hermetic feedthrough for an opto-electronic module. In a further aspect of the present invention, the hermetic optical fiber alignment assembly provides alignment and a terminal for access to an opto-electronic module.

In yet another aspect of the present invention, an improved hermetic optical fiber alignment assembly includes an integrated optical element for coupling the input/output of an optical fiber to the opto-electronic devices in the opto-electronic module. In one embodiment, the integrated optical element comprises a reflective element that is stamped with the alignment groove for the optical fiber.

In one embodiment, the hermetic optical fiber alignment assembly, comprises a first ferrule portion defining an optical element and an optical fiber retention structure (e.g., an alignment groove having an open structure) such that an end face of the optical fiber is located at a predetermined distance from the optical element along the axis of the optical fiber, wherein an end face of the optical fiber is located at a predetermined distance from the optical element along the axis of the optical fiber, and wherein the optical fiber retention structure accurately aligns the optical fiber with respect to the optical element, so that output light from the optical fiber can be directed by the optical element to outside the first ferrule portion or input light from outside the first ferrule portion incident at the optical element can be reflected towards the optical fiber; and a second ferrule portion hermetically attached to the second ferrule portion, wherein the first ferrule includes an extended portion beyond an edge of the second ferrule portion, on which the optical element is located beyond the edge of the second ferrule portion.

In another embodiment, the hermetic optical fiber alignment assembly comprises a first ferrule portion having a first surface defining at least a groove receiving at least an end section of an optical fiber, wherein groove defines the location and orientation of the end section with respect to the first ferrule portion; a second ferrule portion having a second surface facing the first surface of the first ferrule, wherein the first ferrule portion is hermetically attached to the second ferrule portion with the first surface against the second surface, wherein the first ferrule includes an extended portion beyond an edge of the second ferrule portion, on which the groove extends and terminates at an optical element located beyond the edge of the second ferrule portion, wherein an end face of the optical fiber is located at a predetermined distance from the optical element along the axis of the optical fiber, and wherein the groove accurately aligns the optical fiber with respect to the optical element, so that output light from the optical fiber can be directed by the optical element to outside the ferrule or input light from outside the ferrule incident at the optical element can be directed towards the optical fiber.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 5A to 5C are plan views of the hermetic optical fiber assembly in FIG. 4; FIG. 5D illustrates an alternate embodiment.

FIGS. 9A to 9E are sectional views taken along lines 9A-9A to 9E-9E in FIG. 5A.

FIG. 10C is a sectional view taken along line 10C-10C in FIG. 10B.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides an improved hermetic optical fiber assembly, which improves optical alignment, manufacturability, ease of use, functionality and reliability at reduced costs, thereby overcoming many of the drawbacks of the prior art structures.

Figure 1:
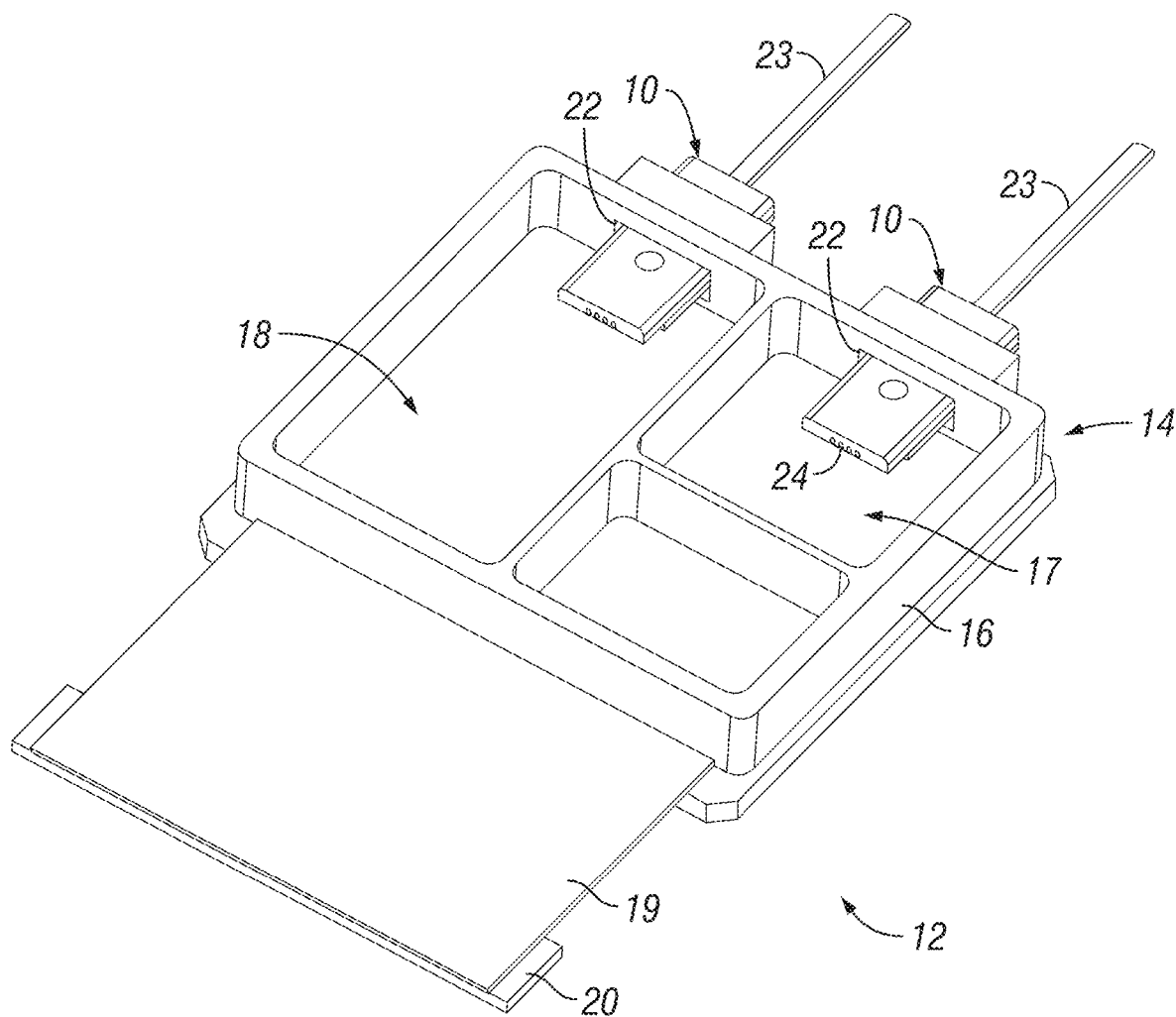
FIG. 1 is a schematic perspective view of an opto-electronic module housing, to which hermetic optical fiber assemblies are hermetically sealed, in accordance with one embodiment of the present invention.

FIG. 1 is a schematic diagram of an opto-electronic module 12, to which hermetic optical fiber assemblies 10 are hermetically sealed, in accordance with one embodiment of the present invention. The opto-electronic module 12 includes a housing 14, which includes a base 16 and a cover hermetically sealed to the housing, protecting the interior of the housing from the environment external of the housing. For simplicity, the cover of the opto-electronic module 12 is omitted in FIG. 1. Enclosed within chambers in the housing are opto-electronic devices 17 and 18 (e.g., transmitter and receiver and associated electronics and/or optical elements (not specifically shown in FIG. 1, but schematically shown in FIG. 3). The electronics within the opto-electronic module 12 are electrically coupled to an external circuit board 20 via flexible electrical connection pins 19.

In the illustrated embodiment, the housing base 16 includes two openings 21 and 22 through which the hermetic optical fiber assemblies 10 are inserted. In accordance with one aspect of the present invention, each hermetic optical fiber assembly 10 serves as a hermetic feedthrough for optical fibers 24 in a fiber ribbon 23. In the illustrated embodiment, there are four optical fibers 24 in the fiber ribbon 23. The hermetic optical fiber assembly 10 also serves as a ferrule, which supports the ends (i.e., a section or "end section") of the optical fibers 24 in a fixed position with respect to each other and with respect to the external surfaces of the hermetic optical fiber assembly 10. As will be elaborated further below, once the hermetic optical fiber assembly 10 is fixed attached to the housing 14 (e.g., by soldering at the opening (21, 22) in base 16), the ends of the optical fibers 24 would be fixed in position (i.e., precisely aligned) with respect to the opto-electronic devices (17, 18) in the housing 14.

Figure 2:
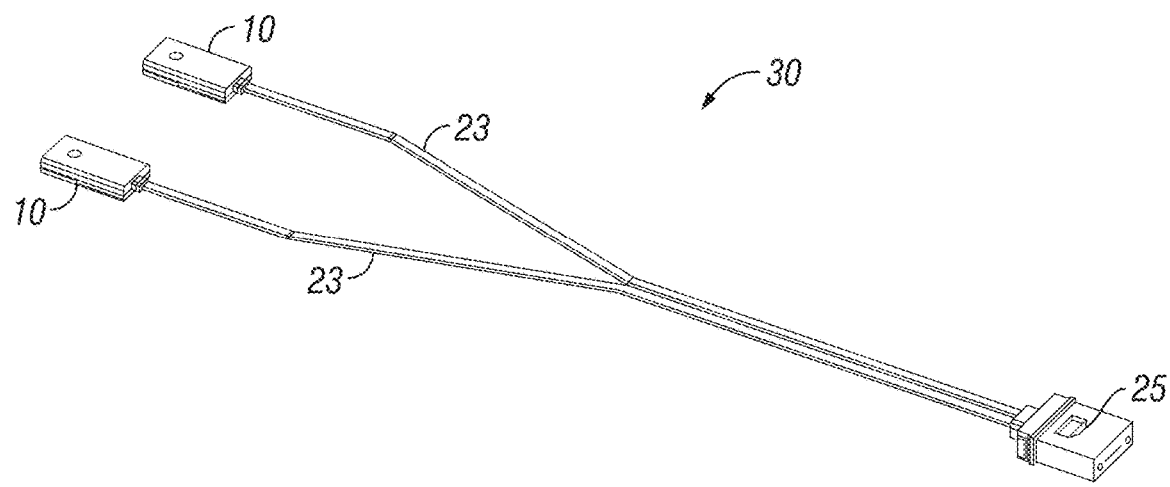
FIG. 2 is a schematic perspective view illustrating an optical jumper patchcord having hermetic optical fiber assemblies, in accordance with one embodiment of the present invention.
Figure 3:
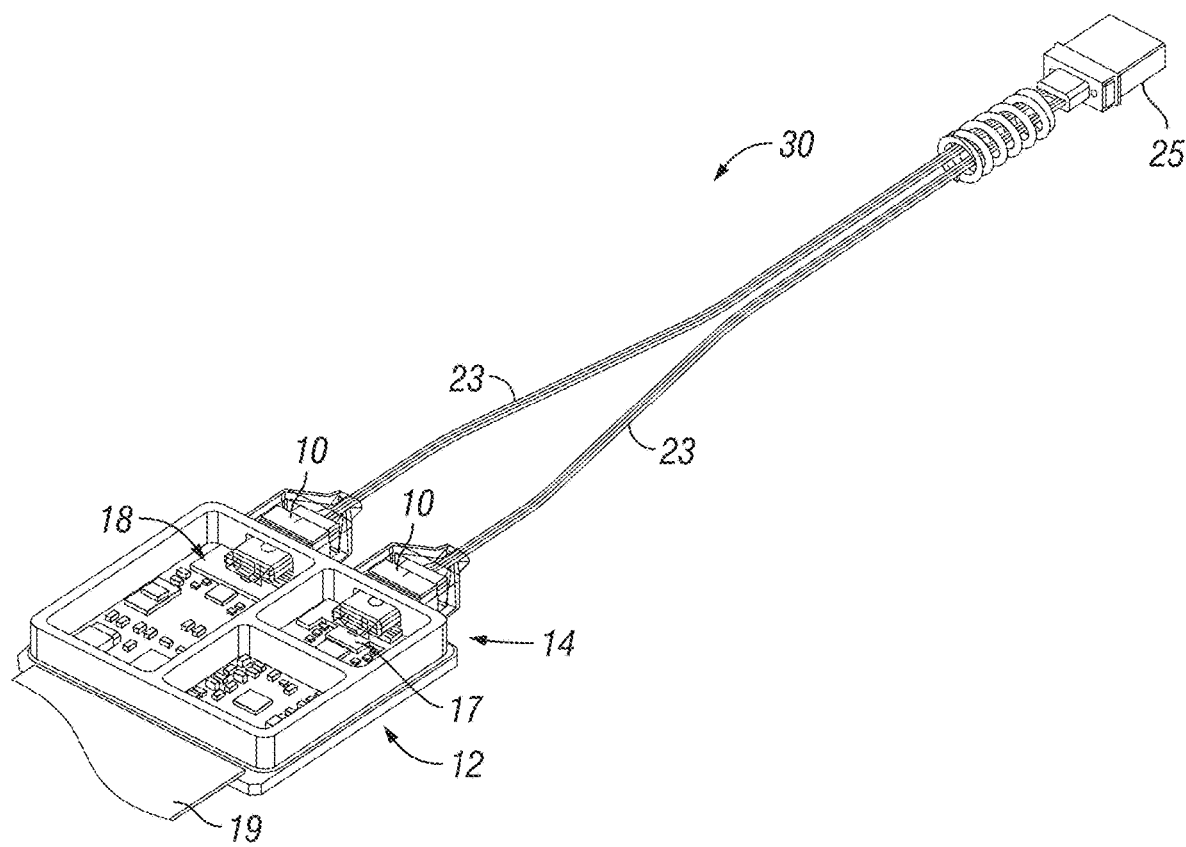
FIG. 3 is a schematic diagram illustrating the optical jumper patchcord in FIG. 2 with the hermetic optical fiber assembly hermetically sealed to an opto-electronic module housing, in accordance with one embodiment of the present invention.

FIG. 2 is a schematic diagram illustrating an optical jumper patchcord 30 having hermetic optical fiber assemblies 10, in accordance with one embodiment of the present invention. FIG. 3 is a schematic diagram illustrating the optical jumper patchcord 30 with the hermetic optical fiber assemblies 10 hermetically sealed to an opto-electronic module housing, in accordance with one embodiment of the present invention. In the illustrated embodiment, the optical jumper patchcord 30 includes two fiber ribbons 23, each terminating at one end with a hermetic fiber optic assembly 10, and commonly terminating at another end with a connector 25 for coupling to a fiber network. The connector 25 and the opto-electronic module 12 may be part of an opto-electronic peripheral board, comprising a circuit board (not shown) that supports the opto-electronic module 12 and the connector 25 at an edge of the circuit board. In which case, the optical jumper patchcord 30 serves as a short optical fiber connection from the opto-electronic module 12 to a built-in terminal (i.e., the connector 25) of the opto-electronic peripheral board for external connection to the fiber network or backplane printed circuit board.

FIGS. 4 to 9 illustrate the detail structures of the hermetic optical fiber assembly 10, in accordance with one embodiment of the present invention. The hermetic optical fiber assembly 10 is essentially a ferrule assembly, having parallel open grooves provided therein for aligning the ends of the optical fibers 24.

Figure 4A:
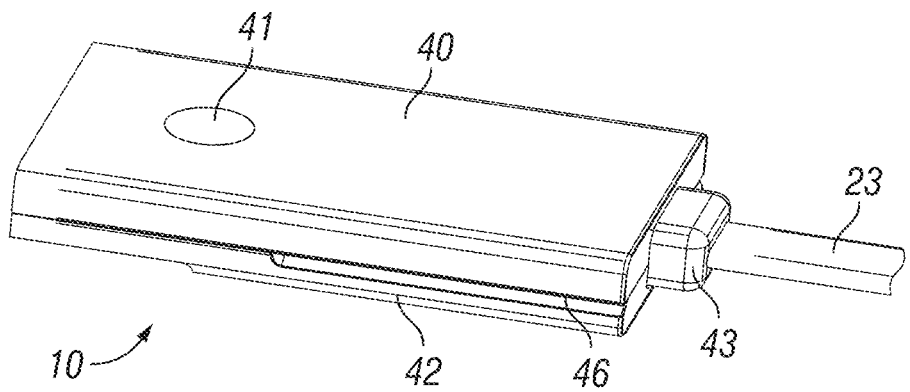
FIGS. 4A to 4C are perspective views of the hermetic optical fiber assembly, in accordance with one embodiment of the present invention.
Figure 4B:
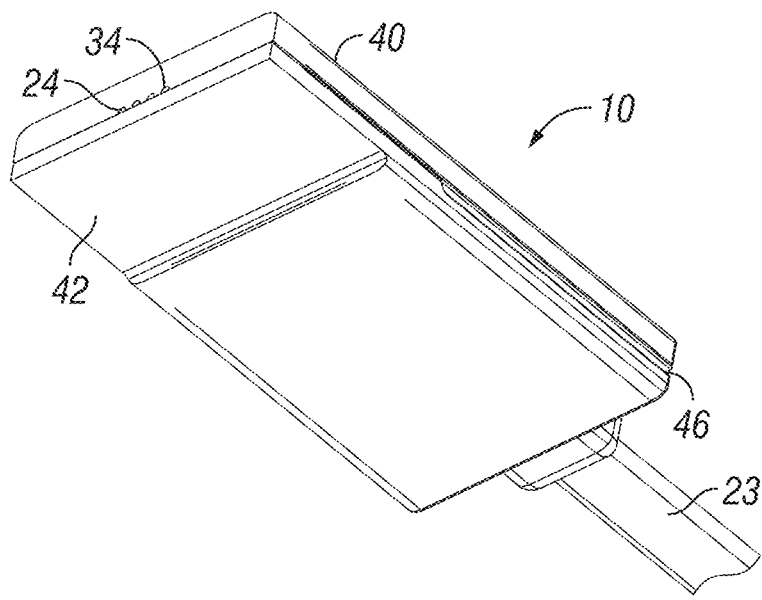
Figure 4C:
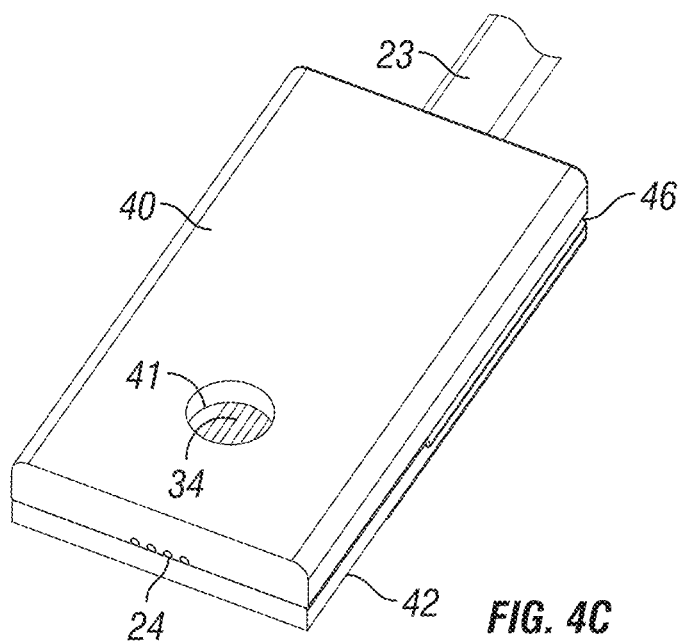
Figure 6:
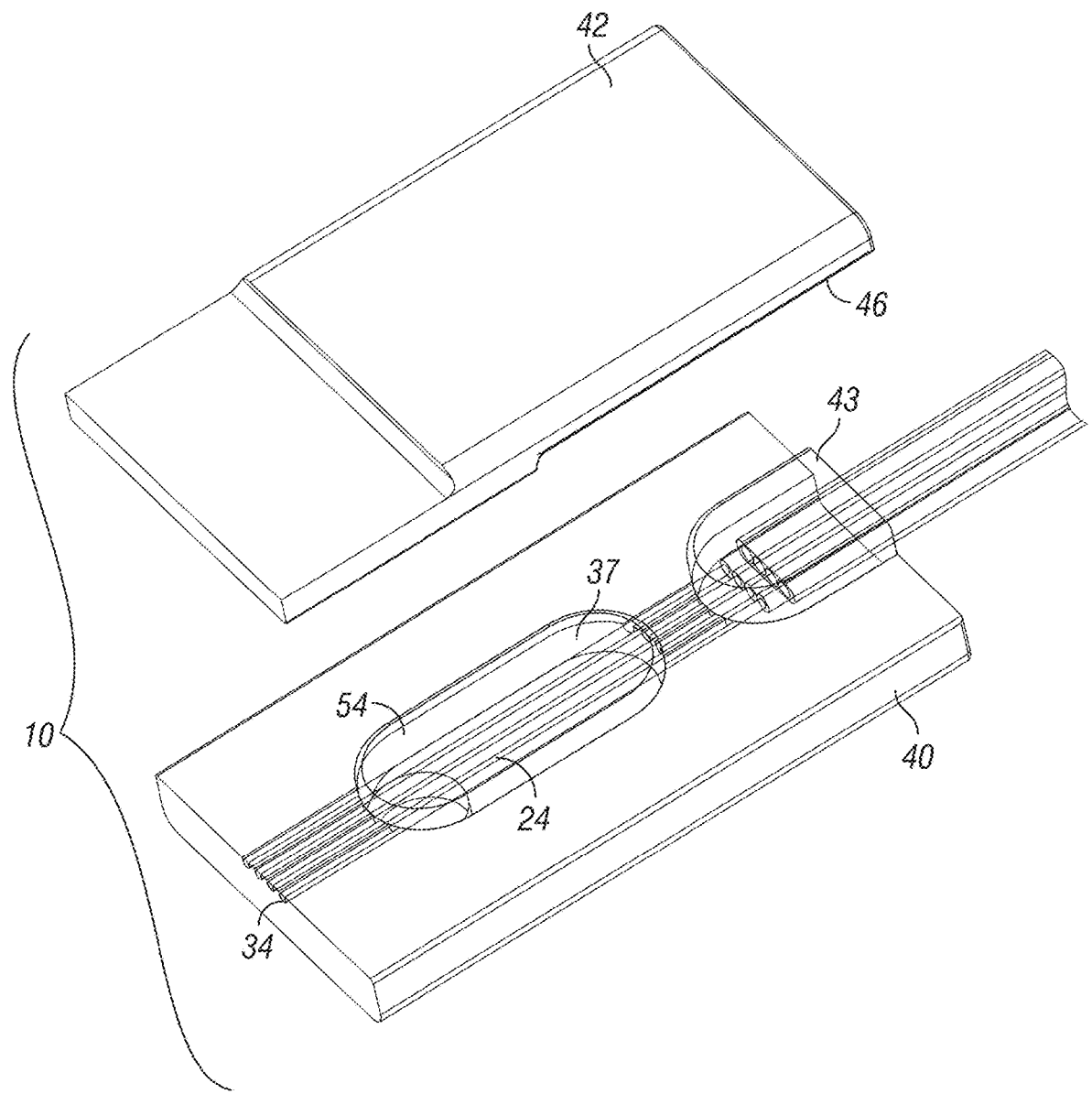
FIG. 6 is an exploded perspective view of the hermetic optical fiber assembly in FIG. 4, in accordance with one embodiment of the present invention.

FIGS. 4A to 4C are perspective views of the hermetic optical fiber assembly 10. FIGS. 5A to 5C are plan views of the hermetic optical fiber assembly 10. FIG. 6 is an exploded perspective view of the hermetic optical fiber assembly 10. FIGS. 9A to 9E are sectional views taken along lines 9A-9A to 9E-9E in FIG. 5A. In the illustrated embodiment, the ferrule assembly 10 comprises two ferrule portions, of which a first ferrule portion (hereinafter referred to as a ferrule 40) is provided with optical fiber alignment grooves 34 and a second ferrule portion (hereinafter referred to as a cover 42) is not provided with any alignment grooves. The ferrule portions each have a generally planar structure (as compared to a tube or sleeve).

Figure 7A:
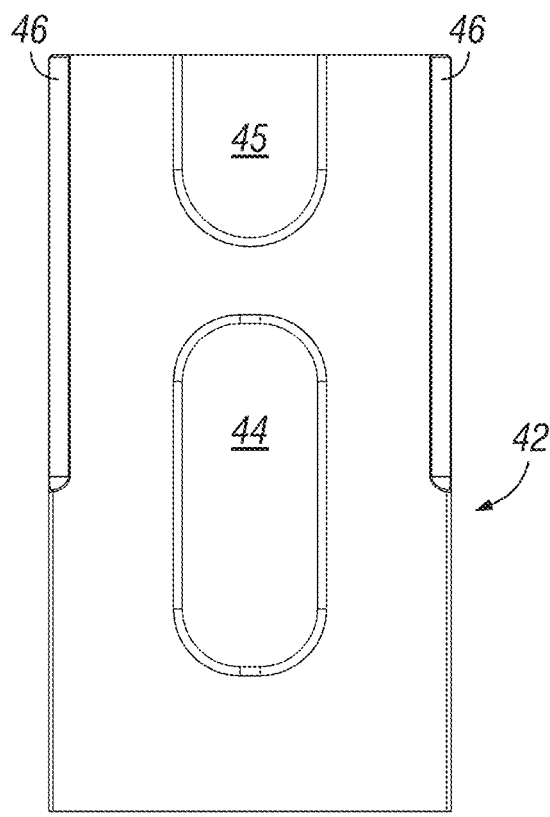
FIGS. 7A to 7E are plan views of the cover of the hermetic optical fiber assembly.
Figure 7B:
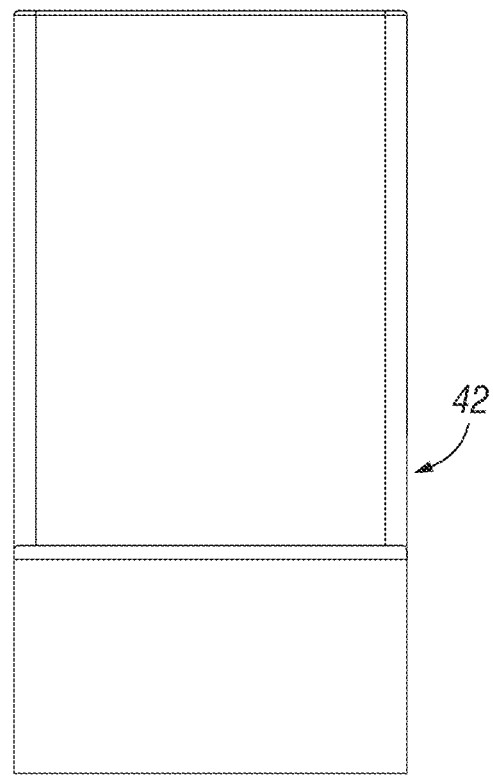
Figure 7C:
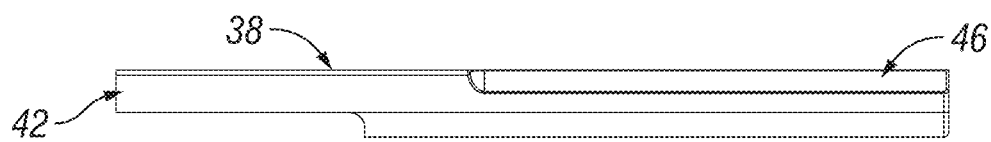
Figure 7D:
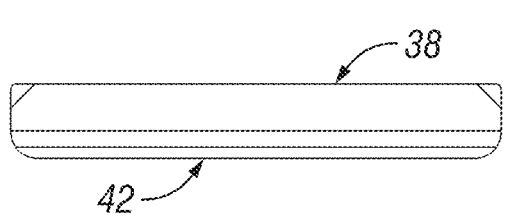
Figure 7E:
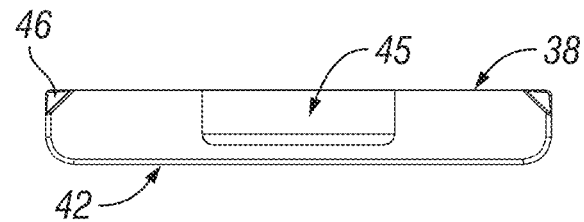

FIGS. 7A to 7E are plan views of the cover 42 of the hermetic optical fiber assembly 10. Referring to FIG. 7A, the underside 38 of the cover 42 (the side facing the ferrule 40) is provided with a shallow well forming a pocket 44 near the center and a cutout 45 at one longitudinal end of the cover 42. Chamfers 46 are provided on the longitudinal edges.

Figure 8A:
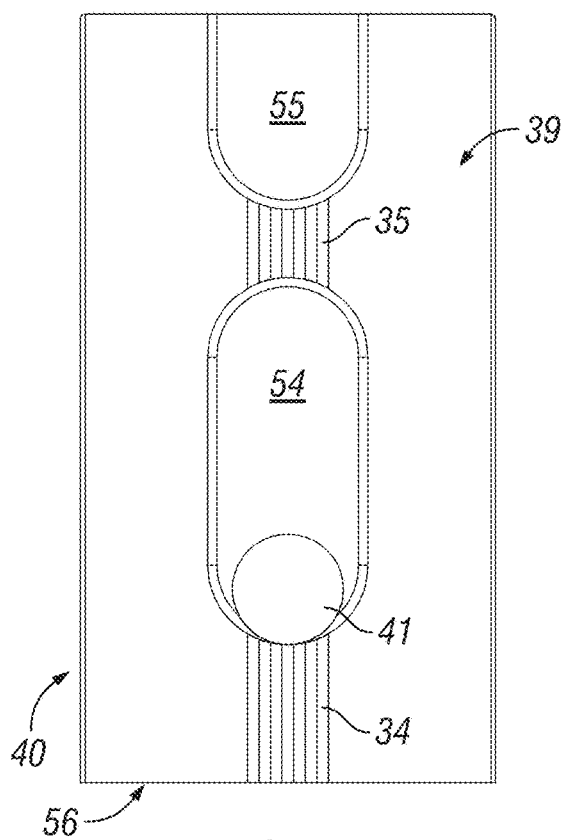
FIGS. 8A to 8E are plan views of the ferrule of the hermetic optical fiber assembly.
Figure 8B:
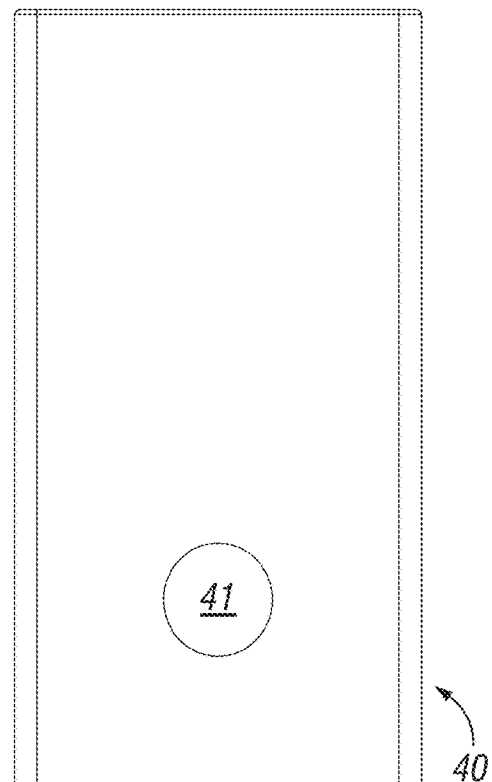
Figure 8C:
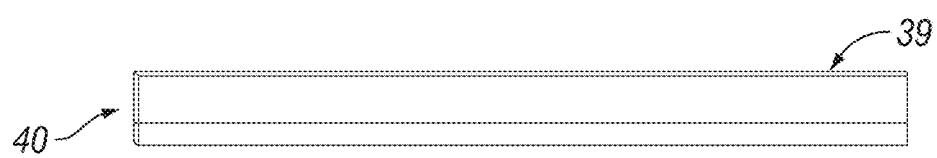

FIGS. 8A to 8E are plan views of the ferrule 40 of the hermetic optical fiber assembly 10. Referring to FIG. 8A, the underside 39 of the ferrule 40 (the side facing the cover 42) is provided with a shallow well forming a pocket 54 near the center and a cutout 55 at one longitudinal end of the ferrule 40, matching the pocket 44 and cutout 45. Parallel longitudinal grooves 34 in a horizontal plane parallel to the underside 39 are provided between the end face 56 and the pocket 54. Additional parallel longitudinal grooves 35 in a horizontal plane parallel to the underside 39 are provided between the pocket 54 and cutout 55. Referring also to FIG. 9E, the grooves 34 and 35 are sized to receive the terminating end sections of each optical fiber 24 (i.e., a short section of each optical fiber bear an end, in its bare state exposing the cladding layer, with protective buffer layer and jacket removed). Specifically, the grooves 34 are precisely sized to precisely position the ends of optical fibers 24 in relation to one another and the external surfaces of the ferrule 40. Upon attaching the hermetic optical fiber assembly 10 to the housing 14 (e.g., by soldering at the opening (21, 22) in base 16), the ends of the optical fibers 24 would be fixed in position (i.e., precisely aligned) with respect to the opto-electronic devices (17, 18) in the housing 14.

As more clearly shown in FIG. 9E, when the cover 42 and the ferrule 40 are mated together with the underside 38 of cover 42 and underside 39 of ferrule 40 against each other, the pockets 44 and 45 together define a cavity 48 through which a section of each optical fiber 24 is suspended (i.e., not touching the ferrule 40 and the cover 42. The ferrule 40 is provided with an aperture 41, through which sealant can be feed into the cavity 48. Referring also to FIG. 9B, the width of the aperture 41 is substantially wider than the diameter of an optical fiber 24, and extends across the ferrule to expose all the optical fibers 24 arranged in parallel (see FIG. 4C; i.e., the width of the aperture 41 is wider than all the grooves 34 combined in the plane of the ferrule 40). Further, the cutouts 45 and 55 together form a pocket 49 that receives a strain relief 43, which supports the fiber ribbon 24 (including protective layers over the bare optical fibers 24) at the other end of the assembly 10.

Figure 8D:
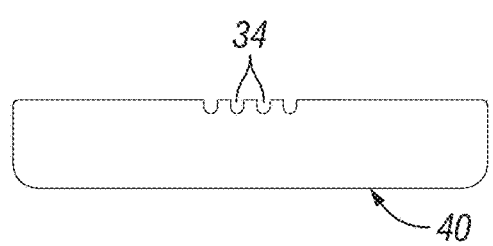
Figure 8E:
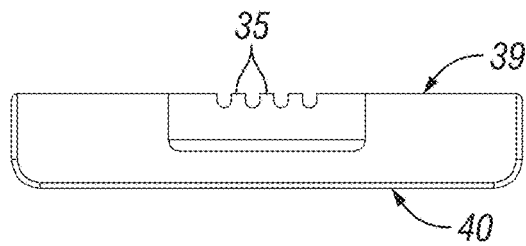
Figure 9A:
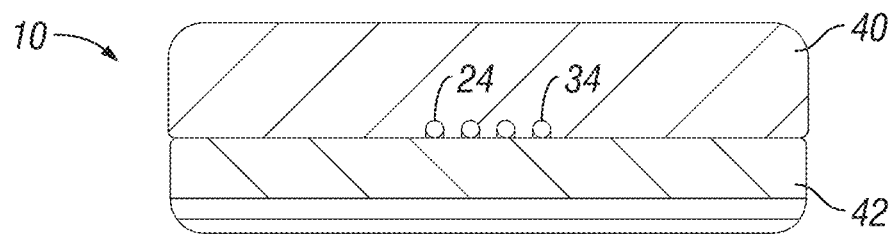
Figure 9B:
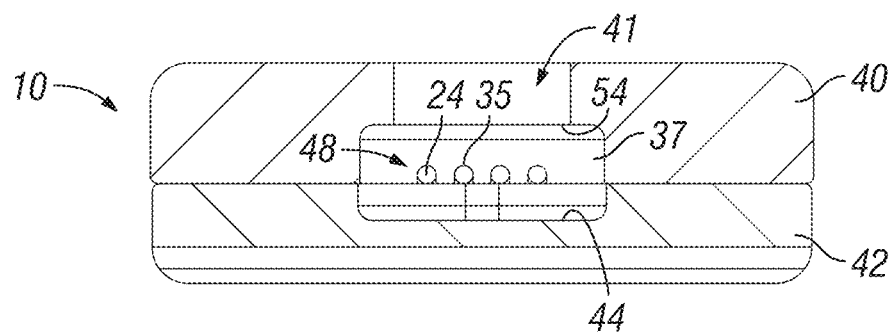
Figure 9C:
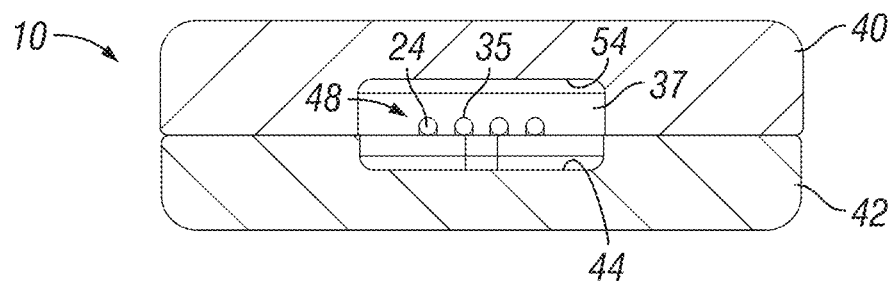
Figure 9D:
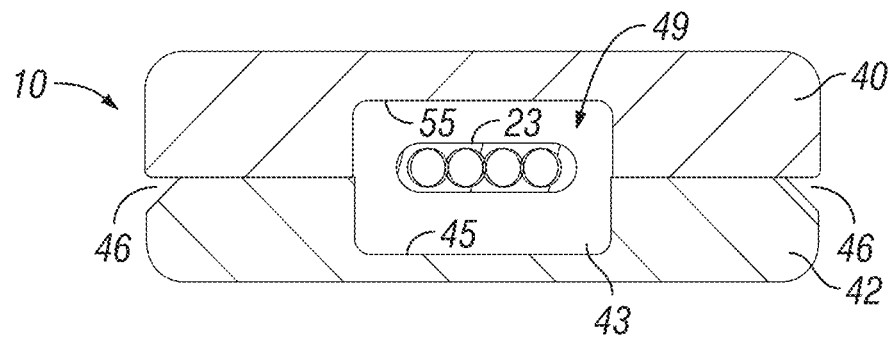

Referring to FIGS. 8D and 9A, the walls of the grooves 34 define a generally U-shaped cross-section. The depth of each groove 34 is sized to completely retain an optical fiber without protruding above the groove 34, with the top of the optical fiber substantially in line with the top of the groove (i.e., at substantially the same level as the surface of the underside 39). When the cover 42 and the ferrule 40 are mated together with the underside 38 of cover 42 and underside 39 of ferrule 40 against each other, the underside 48 of cover 42 just touches the top wall of the optical fibers as it covers over the grooves 34, thus retaining the optical fibers 24 in the grooves 34.

The grooves 34 are structured to securely retain the optical fibers 24 (bare section with cladding exposed, without protective buffer and jacket layers) by clamping the optical fibers 24, e.g., by a mechanical or interference fit (or press fit). For example, the width of the grooves 34 may be sized slightly smaller than the diameter of the optical fibers 24, so that the optical fibers 24 are snuggly held in the grooves 34 by an interference fit. The interference fit assures that the optical fibers 24 is clamped in place and consequently the position and orientation of the ends of the optical fibers 24 are set by the location and longitudinal axis of the grooves 34. In the illustrated embodiment, the grooves 34 has a U-shaped cross-section that snuggly receive the bare optical fibers 24 (i.e., with the cladding exposed, without the protective buffer and jacket layers). The sidewalls of the groove 34 are substantially parallel, wherein the opening of the grooves may be slightly narrower than the parallel spacing between the sidewalls (i.e., with a slight C-shaped cross-section) to provide additional mechanical or interference fit for the optical fibers 24. Further details of the open groove structure can be found in copending U.S. patent application Ser. No. 13/440,970 filed on Apr. 5, 2012, which is fully incorporated by reference herein. The ferrule 40 having the grooves 34 is effectively a one-piece open ferrule supporting the optical fibers 24 with their ends in precise location and alignment with respect to each other and to the external geometry of the ferrule 40.

The grooves 34 may be provided with a rounded bottom in cross-section (see, FIG. 9A), which would conformally contact as much as half the cylindrical wall (i.e., semicircular cylindrical wall) of the optical fibers. In any event, the wall of the optical fibers 24 would come into contact (e.g., compressive contact) with at least the side walls of the grooves 34, with at least the lateral sides of the optical fibers in tight contact (e.g., substantially tangential contact in cross-section) with the side walls of the grooves 34. Such lateral contact between the optical fibers and adjacent sidewalls of the grooves 34 ensures a geometry that defines the necessary horizontal alignment positioning/spacing of the optical fibers 24 with respect to each other and with respect to at least the lateral sides of the ferrule 40. The precise sizing of the depth of the grooves 34 in the ferrule 40 ensures a geometry in reference to the cover 42 that defines the necessary vertical alignment positioning of the optical fibers 24 with respect to at least the external surface (top surface opposite to the underside 39) of the ferrule 40.

Concerning the grooves 35 for retaining the section of the optical fibers 24 further away from the ends of the optical fibers 24 on the other side of the cavity 48, they may have similar geometries and/or design considerations as the grooves 34. However, it is noted that for purpose of optical alignment of the optical fibers, it is only necessary to provide alignment grooves 34 having tight tolerance for supporting the terminating end section of the optical fibers 24. The grooves 35 provided nearer to the strain relief 43 need not have as strict a tolerance compared to that of the grooves 34, as the tolerance of the grooves would have no bearing on the optical alignment of the ends of the optical fiber 24 with respect to an external optical component.

The hermetic sealing of the assembly 10 can be implemented by the following procedure, in accordance with one embodiment of the present invention. With the protective buffer and jacket layers removed at the end section, the optical fibers 24 is positioned into the grooves 34 and 35 in the ferrule 40. The cover 42 is mated against the ferrule (e.g., by an external clamping fixture) in the configuration illustrated generally by FIG. 9E. The cover 42 and ferrule 40 are soldered together using gold-tin solder. The chamfer 46 provides some clearance to allow bleeding of excess solder. It is noted that the chamfer 46 is shown not to extend along the entire length of the cover 42, to reduce potential clearance to facilitate soldering between the assembly 10 and the module housing 14.

Figure 13:
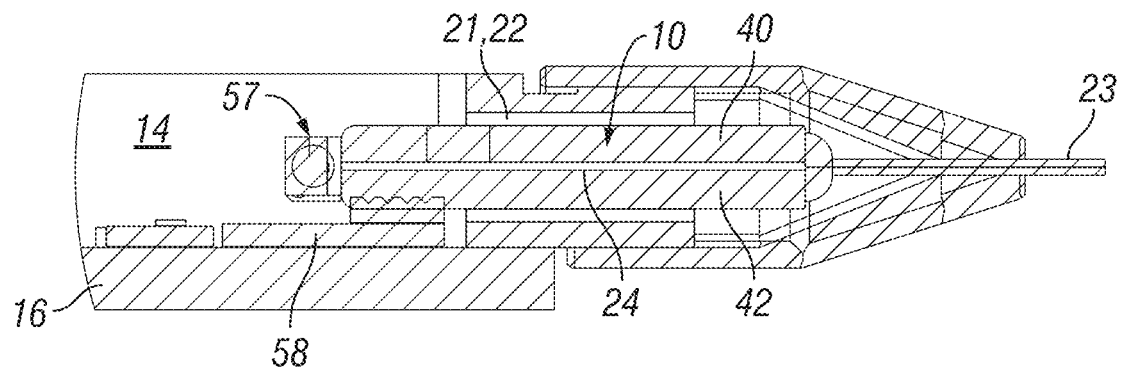
FIG. 13 is a sectional view showing addition detail of the mounting of the hermetic optical fiber assembly to the opto-electronic module housing, in accordance with another embodiment of the present invention.

Referring also to FIG. 13, a sealant 37 such as glass solder (or other sealant suitable for hermetic sealing) is feed through the aperture 41 in the ferrule 40 as vacuum is applied to the pocket 49, thus drawing glass solder to fill the cavity 48 and available spaces/clearance between the optical fibers 23, the grooves 35 and the cover 42, given the grooves are generally U-shaped in cross-section. (See FIG. 13). Some of the glass solder also flows to fill available spaces between the optical fibers, alignment grooves 34 and the cover 42. It is not necessary to draw glass solder completely through the grooves 34 or 35, as long as there is sufficient sealant drawn to a sufficient distance to plug available spaces at least at a region near the entry from the cavity into the respective grooves. Given the pockets 44 and 54 have depths deeper than the depths of the grooves 34 and 35, the sealant wraps around the sections of the optical fiber 24 suspended in the cavity 48. The sealant essentially forms a hermetic plug in the cavity 48, restricting leakage through the assembly 10. The structure of the assembly 10 can be hermetically sealed without requiring any external sleeve, beyond the two ferrule portions (ferrule 40 and cover 42 in the above described embodiment). The structure of the hermetic assembly is thus very simple, which provides an effective hermetic seal.

It is noted that given the tight contact between the wall of the optical fibers and the walls of at least the grooves 34, the sealant does not come between the contact surfaces between the optical fibers 24, the cover 42 and the walls of groove 34 which were present prior to applying the sealant. It is intended that the sealant plugs available spaces and/or clearance between the optical fibers 24, grooves 34 and cover 42, but do not form an intermediate layer between the optical fibers and the groove walls at the contact points prior to applying the sealant, which could otherwise affect the alignment of the optical fibers by the grooves 34.

After sealing with the glass solder, an epoxy material is applied into the pocket 49 to form the strain relief 43. The exposed ends of the optical fiber 24 may be polished to be substantially coplanar with the end face 56 of the ferrule 40 to finish the hermetic assembly 10. The ends of the fibers 24 may protrude slightly (by at most a few microns) beyond the end face 56 of the ferrule 40 but do not extend appreciably beyond the end face 56 because there is no protective buffer and jacket layers at the respective ends of the optical fibers 24. To facilitate soldering of the assembly to the module housing 14 and to improve corrosion resistance, the surfaces of the cover 42 and/or the ferrule 40 may be gold plated.

According to one aspect of the present invention, the ferrule 40 and/or the cover 42 may be formed by precision stamping a metal material. In one embodiment, the metal material may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Alternatively, the material may be silicon, a hard plastic or other hard polymeric material.

The above disclosed open structure of the ferrule 40 and cover 42 lends themself to mass production processes such as stamping, which are low cost, high throughput processes. A precision stamping process and apparatus has been disclosed in U.S. Pat. No. 7,343,770, which was commonly assigned to the assignee of the present invention. This patent is fully incorporated by reference as if fully set forth herein. The process and stamping apparatus disclosed therein may be adapted to precision stamping the features of the ferrule 40 and cover 42 of the present invention. The stamping process and system can produce parts with a tolerance of at least 1000 nm.

FIG. 5D illustrates an alternate embodiment, in which complementary alignment grooves 34' and 34" (e.g., grooves having C-shaped or semi-circular cross-section) are provided on the ferrule portions 40' and 42', respectively. The grooves 34' and 34" may be symmetrical or asymmetrical with respect to the contact interface between the ferrule portions 40' and 42" in the end view of FIG. 5D (or sectional view orthogonal to the longitudinal axis of the grooves). The ferrule portions 40' and 42" may be identical in an alternate embodiment. Alternatively, grooves having V-shaped cross-section could be used instead of U-shaped or C-shaped grooves in the ferrule 40, cover 42, and/or ferrule portions 40' and 42'.

Instead of providing an aperture in the ferrule 40 for feeding glass solder, such aperture may be provided in the cover 42 instead, or in addition. Further, the cavity 48 may be defined by a pocket provided in only one of the ferrule 40 and the cover 42. Alternatively, instead of wells defining the pockets 44 and 54, grooves of significant larger size may be provided in the cover 42 and/or ferrule 40 bridging the grooves 34 and 35 (i.e., large clearances between optical fibers 24 and the larger grooves to facilitate flow of sealant to hermetically, internally plug the assembly).

While the above embodiments are directed to a hermetic multi-fiber ferrule assembly, the present inventive concept is equally applicable to a hermetic single-fiber ferrule assembly.

Figure 10A:
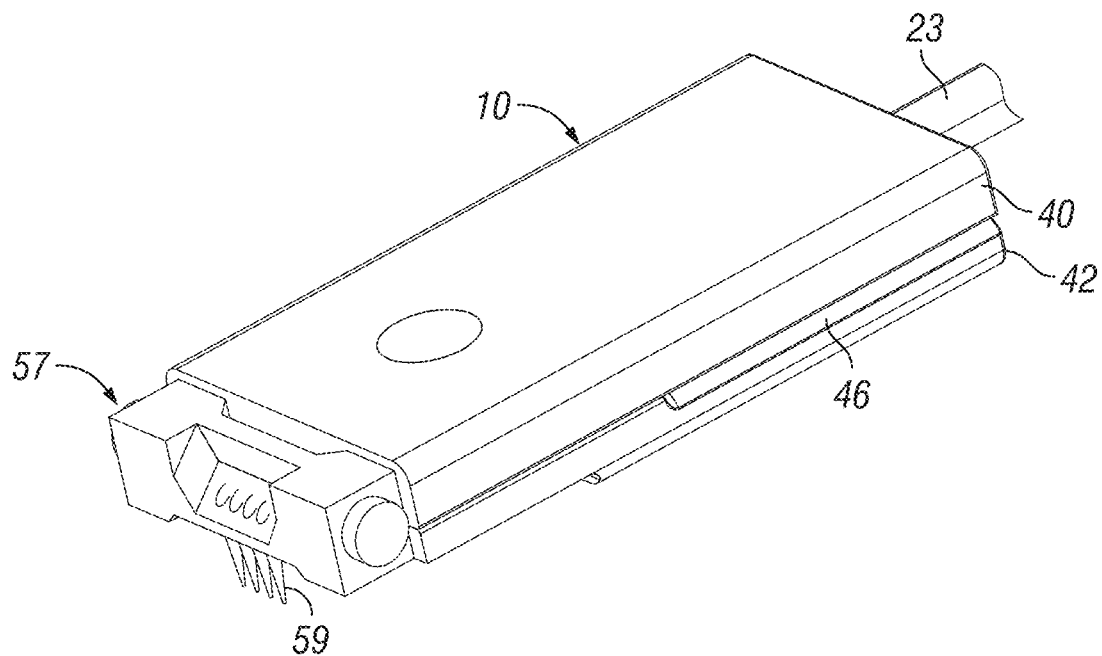
FIGS. 10A and 10B are perspective views of a light directing element at the exit end of the optical fibers in the hermetic optical fiber assembly, in accordance with one embodiment of the present invention.
Figure 10B:
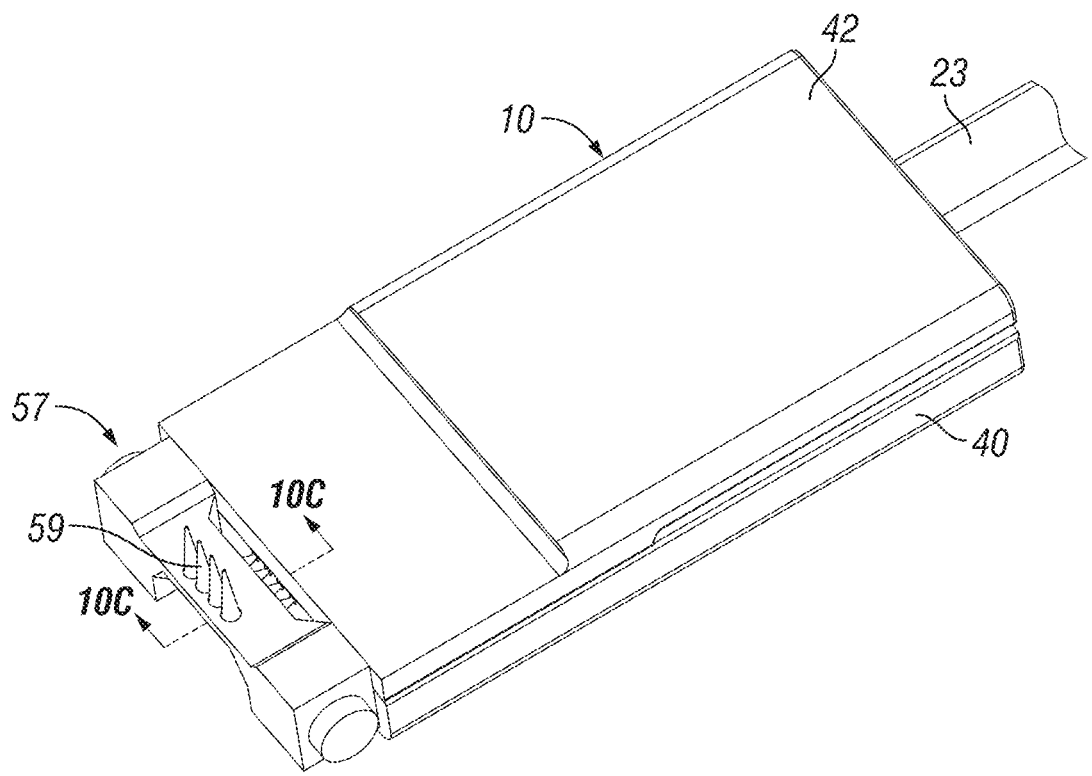

FIGS. 10A and 10B are perspective views of a light directing element at the end of the optical fibers 24 in the hermetic optical fiber assembly 10 discussed above; FIG. 10C is a sectional view taken along line 10C-10C in FIG. 10B. A separate mirror assembly 57 (schematically shown) is positioned and aligned with the ends of the optical fibers 24, to direct light input/output between the fiber ends and an opto-electronic device 58 (schematically shown), such as a transmitter (e.g., a laser such as a VCSEL—Vertical Cavity Surface-Emitting Laser) or a receiver (e.g., photodetector). These opto-electronic devices convert between electrical signals and optical signals, and are contained in the opto-electronic module 12. FIG. 13 is a sectional view showing additional detail of the mounting of the hermetic optical fiber assembly 10 through the openings (21, 22) in the base 16 of opto-electronic module housing 14, in accordance with another embodiment of the present invention.

The mirror assembly 57 may be attached to the assembly 10, and the input/output of the mirror assembly 57 is positioned and aligned with respect to the opto-electronic device 58. Alternatively, the mirror assembly 57 is supported within the module 12 and aligned with respect to the opto-electronic device 58, with the hermetic assembly 10 aligned to the mirror assembly 57. Reference also to FIG. 3, the hermetic assembly 10 is hermetically sealed to the module housing base 16. The hermetic assembly 10 may be deemed to function both as a feedthrough and as an alignment ferrule for the optic fiber ribbon 23.

While the above described embodiments are described in reference to a hermetic ferrule assembly that has a generally rectangular cross-section, other cross-sectional geometry may be implemented without departing from the scope and spirit of the present invention.

Figure 11:
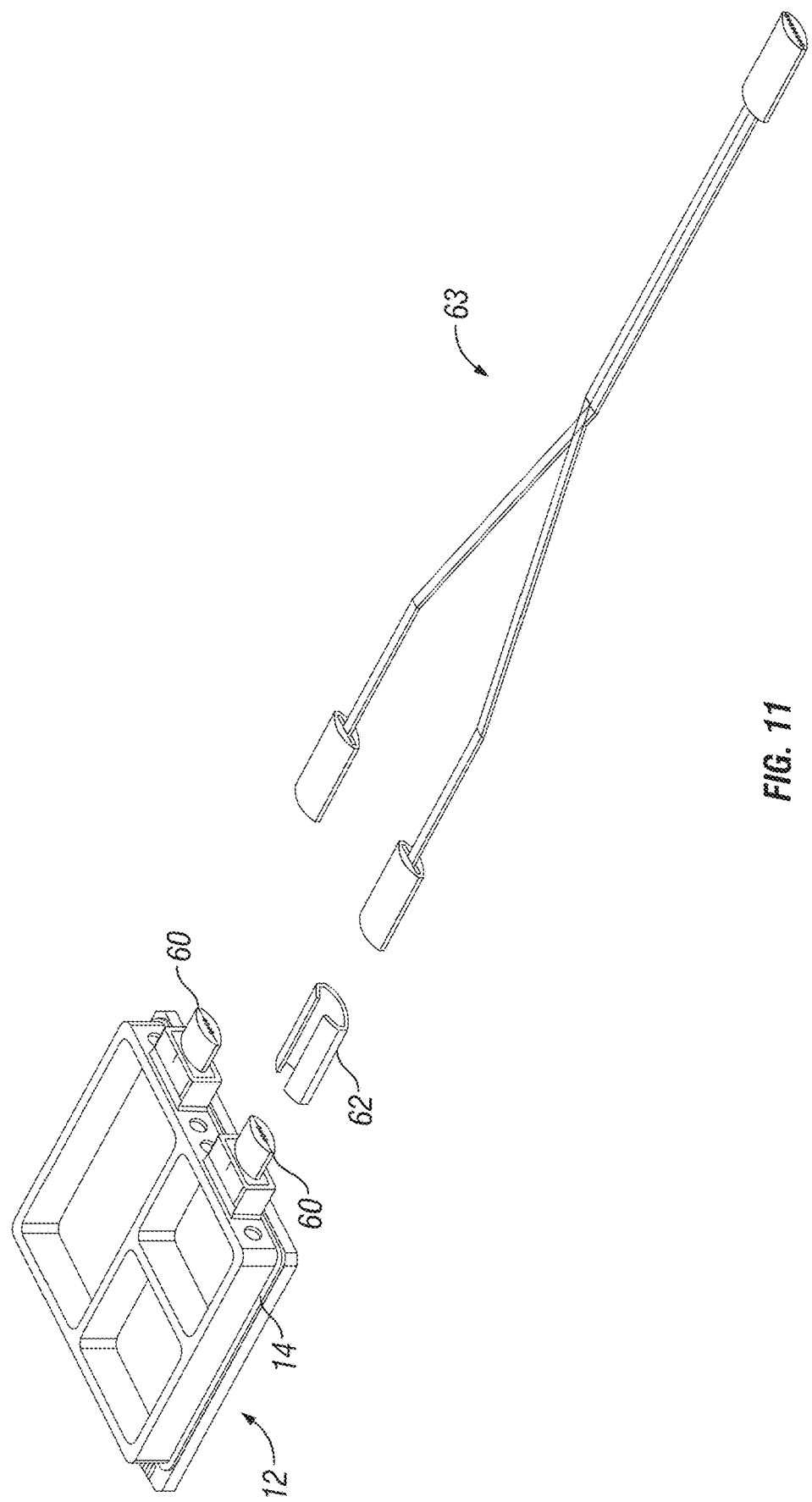
FIG. 11 is a schematic perspective view of an opto-electronic module housing, to which hermetic optical fiber assemblies are hermetically sealed, in accordance with another embodiment of the present invention.
Figure 12:
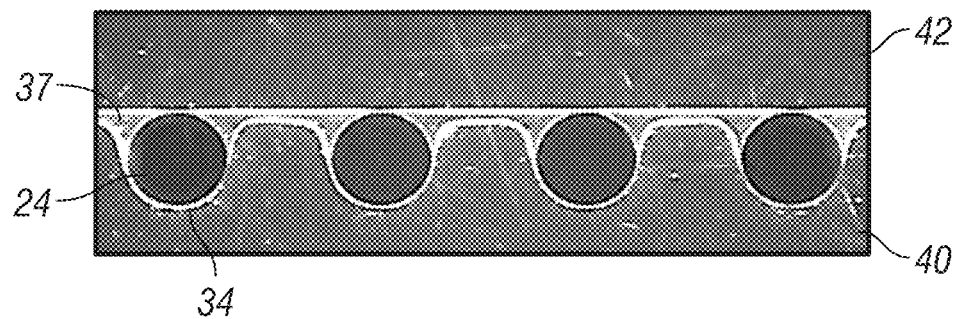
FIG. 12 is a photographic sectional view of a prototype of the hermetic optical fiber assembly.

Referring to embodiment illustrated in FIG. 11, the hermetic ferrule assembly may have a generally oval cross-section. The structure of the hermetic assembly 60 may be similar to the hermetic assembly 10 in the earlier embodiments, except that the external cross-sectional profile is generally oval. The hermetic assembly 60 includes two ferrule portions which together make up the hermetic assembly having the oval cross-section. One of the ferrule portions may correspond to the cover 42 in the prior embodiment (having similar surface features as the underside 38) and the other one of the ferrule portions may correspond the ferrule 40 in the prior embodiment (having similar surface features as the underside 39). In this embodiment, instead of providing the hermetic ferrule assembly connected to a optic fiber ribbon 23 as in the prior embodiments, the hermetic ferrule assembly 60 is hermetically attached to the housing 14 of the opto-electronic module 12, having only bare optical fibers 24 (i.e., without buffer and protection layers) held within the assembly 60 without extending at both ends appreciably beyond the assembly 60 (i.e., the optical fibers held in the assembly 60 terminates substantially coplanar with both end faces of the assembly 60; one of the end faces of the assembly 60 being inside the module housing 14). In this embodiment, the fiber alignment grooves would be precisely formed (e.g., by stamping) at high tolerance for both ends of the optical fibers. Alternatively, the oval hermetic assembly in FIG. 11 may be replaced with the hermetic assembly 10 in the prior embodiment, in which case an alignment sleeve having a generally rectangular cross-section would be required.

Accordingly, in this embodiment, the hermetic ferrule assembly 60 provides a demountable terminal for the module 12, for coupling to another optical device, such as an optical fiber ribbon (e.g., a patch cord 63 having similarly shaped ferrules having oval cross-section), by using an alignment sleeve 62 (e.g., a split sleeve having complementary shape sized to receive the ferrule assembly 60 and the ferrule on the patch cord 63). In this embodiment, the hermetic assembly 60 may be deemed to be a hermetic terminal of the module 12 having an alignment ferrule for optical alignment to external devices. With this embodiment, a defective external optical fiber ribbon may be replaced by plugging a replacement fiber ribbon onto the hermetical ferrule terminal.

In yet another aspect of the present invention, an improved hermetic optical fiber alignment assembly includes an integrated optical element for coupling the input/output of an optical fiber to the opto-electronic devices in the opto-electronic module. Instead of a separate, external optical module (e.g., mirror module 57) in the embodiments of FIGS. 10 and 13, the improved hermetic optical fiber alignment assembly includes an integrated optical element (e.g., the optical element and the ferrule portion are part of the same monolithic structure). In one embodiment, the integrated optical element comprises a reflective element that is stamped with the alignment groove for the optical fiber in the ferrule portion of the hermetic optical fiber alignment assembly. In the embodiments discussed below, the optical element is a structured reflective surface that is an integral extension from the alignment groove in the ferrule in the above discussed embodiments of the hermetic optical fiber alignment assemblies. The end of the optical fiber is at a defined distance to and aligned with the structured reflective surface. The reflective surface directs light to/from the input/output ends of the optical fiber by reflection. The open structure open structure of the structured reflective surface and fiber alignment groove lends itself to mass production processes such as precision stamping.

The present invention adopts the concept of stamping optical elements disclosed in the earlier filed copending U.S. patent application Ser. No. 13/786,448 (to which priority has been claimed), which had been fully incorporated by reference herein.

Figure 14:
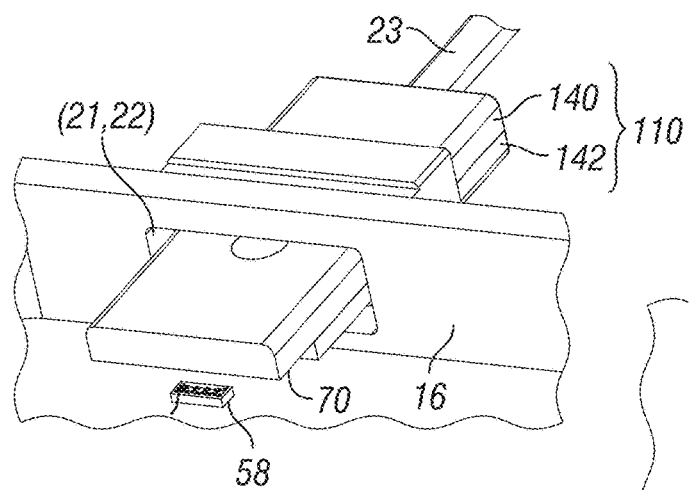
FIG. 14 is a schematic perspective view of a hermetic optical fiber alignment assembly having an integral optical element, in accordance with one embodiment of the present invention.
Figure 15:
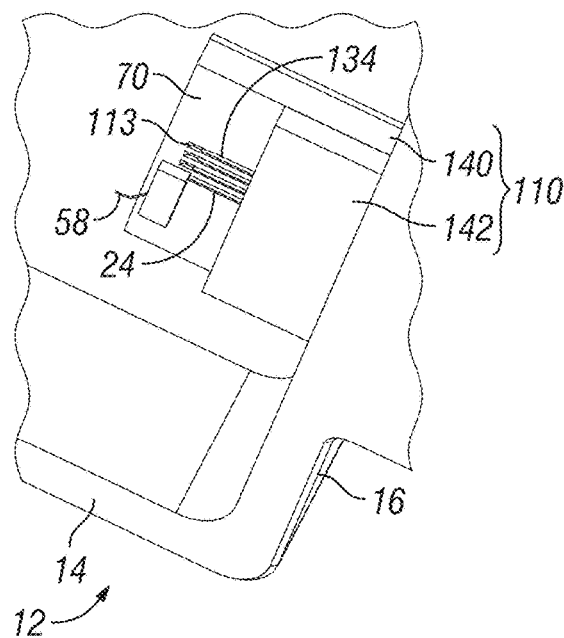
FIG. 15 is a schematic perspective view of the underside of the hermetic optical fiber alignment assembly of FIG. 14.
Figure 16:
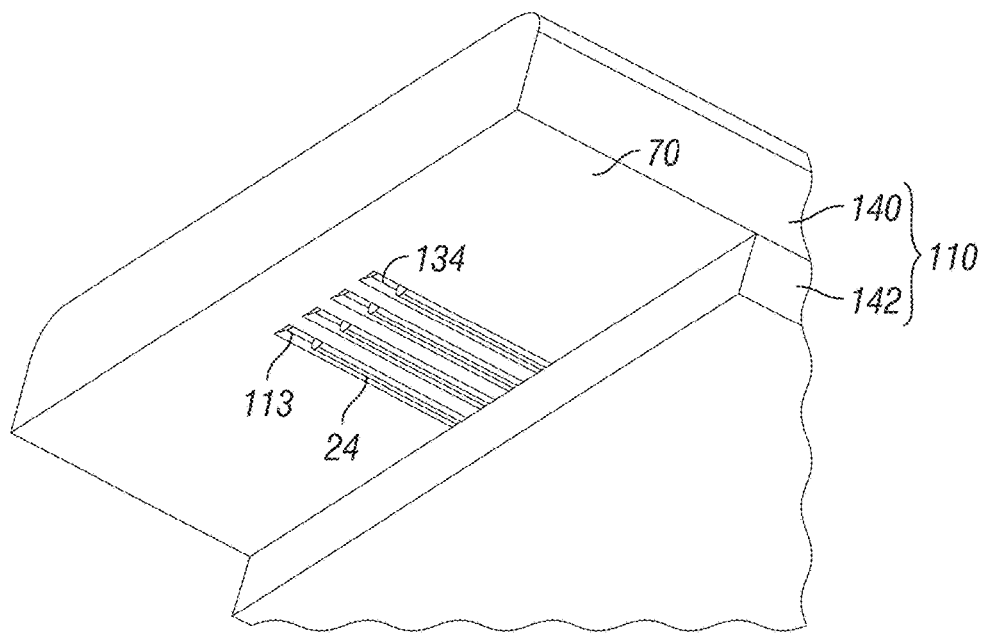
FIG. 16 is an enlarged perspective view of the extended portion of the ferrule, in accordance with one embodiment of the present invention.

In the embodiment illustrated in FIGS. 14 and 15, the hermetic optical fiber alignment assembly 110 has similar structure as the hermetic assembly 10 disclosed above, with the exception that instead of terminating the optical fibers 24 at an end face of the assembly, the ferrule is extended such that the alignment grooves extends to structured reflective surfaces and the ends of the optical fibers 24 are positioned in relation to the structured reflective surfaces. The hermetic optical fiber alignment assembly 110 includes a ferrule 140 and a cover 142, which are essentially similar in structure to the ferrule 40 and cover 142 in the prior embodiments, with the exception of the extended structure of the ferrule 140. The end of the ferrule 140 near the terminating ends of the optical fibers 24 is not coplanar with the end of the cover 142. The ferrule 142 has a portion 70 that extends beyond the adjacent end of the cover 142. Referring to FIG. 15, the ferrule 142 is provided with fiber alignment grooves 134 that extend beyond the edge of the cover to the extended portion 70. Each groove 134 terminates in a structured reflective surface 113 located beyond the adjacent edge of the cover 142. Each optical fiber 124 extends in the groove 134 to beyond the edge of the cover 142, to closer to the structured reflective surface 113. FIG. 6 illustrates an enlarged view of the extended portion 70.

Figure 17A:
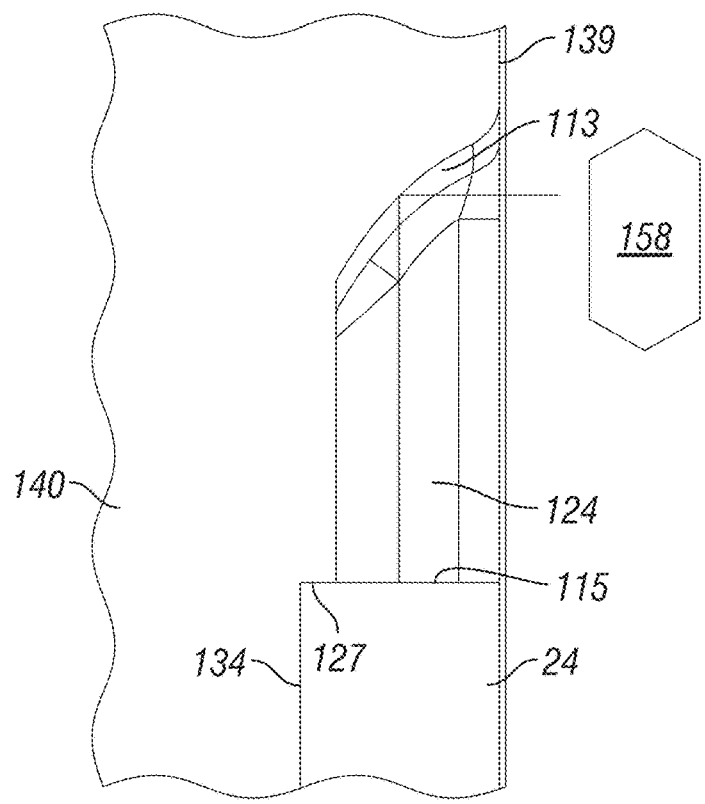
FIG. 17A is a sectional view of the fiber alignment groove along a longitudinal axis of the optical fiber.
Figure 17B:
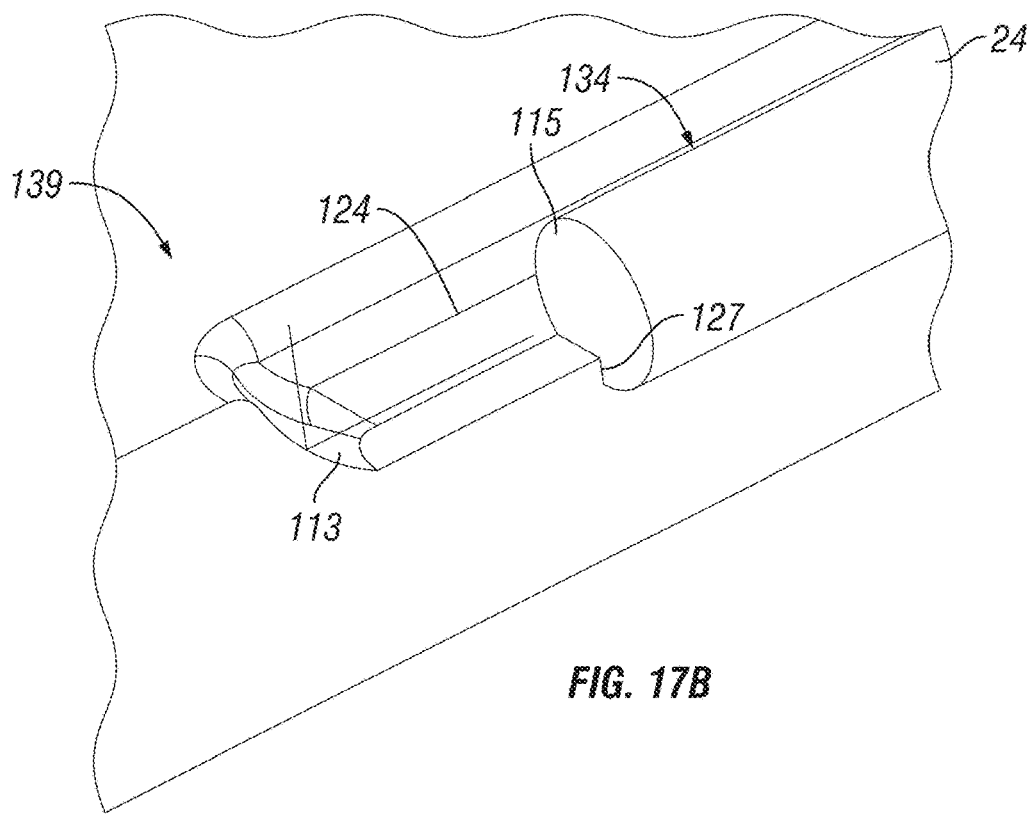
FIG. 17B is a perspective sectional view thereof.

FIG. 17A is a sectional view taken along the longitudinal axis of the optical fiber 10. FIG. 17B is a perspective section view taken along the longitudinal axis of the optical fiber 10. In the illustrated embodiment, the fiber alignment groove 134 positively receives the optical fiber 24 in a manner with the end of the optical fiber 24 at a defined distance to and aligned with the structured reflective surface 113. The location and orientation of the structured reflective surface 113 is fixed in relation to the fiber alignment groove 134. In the illustrated embodiment, the groove 134 and the structured reflective surface 113 are defined on the same (e.g., monolithic) ferrule 140. The groove 134 has a section 124 defining a space between the end face 15 of the optical fiber 24. In the illustrated embodiment, this section 124 has a similar width but a shallower bottom as the remaining sections of the groove 134. The section 124 defines a shoulder 127 that provides a stop against which a portion (end) of the end face 113 of the optical fiber 24 is butted. Accordingly, a distance (e.g., 245 µm) along the optical axis is defined between the end face 115 and the structured reflective surface 113. In the illustrated embodiment, the optical fiber is completely received in the groove 134, with the exterior surface of the optical fiber 24 flush with the top surface 139 of the ferrule 140. Given an optical fiber having a diameter of 125 µm, and a VCSEL light source 158 at an effective distance (e.g., from the flat surface of the VCSEL 158 along the optical axis) of 100 µm from the structured reflective surface 113, the distance of the flat surface of the VCSEL 158 from the top surface 139 of the ferrule would be about 37.5 µm.

The design considerations of the open groove 134 are similar to the grooves 34 in the earlier embodiments (e.g., a generally U-shaped cross-section that snuggly receive the bare optical fiber 24, etc. The design considerations for the structured reflective surface are similar to those disclosed in copending U.S. patent application Ser. No. 13/786,448.

Figure 18:
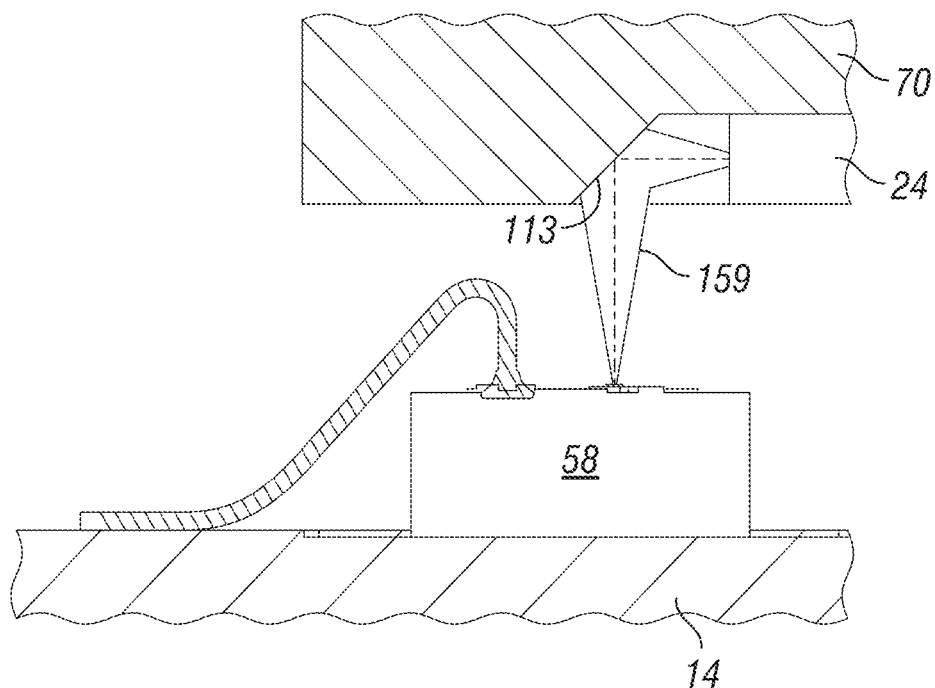
FIG. 18 is a sectional view illustrating reflection of light between optical fiber and an opto-electronic device, in accordance with one embodiment of the present invention.
Figure 19:
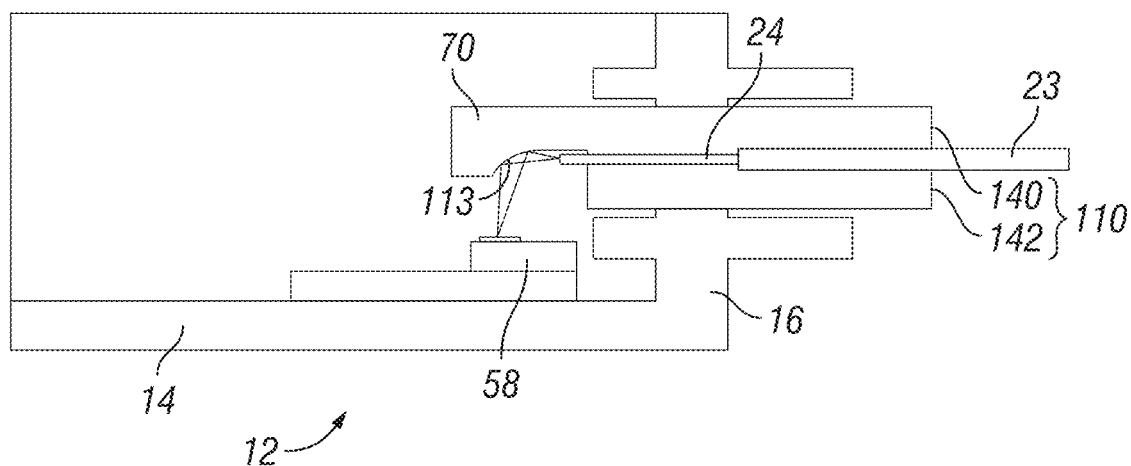
FIG. 19 is a sectional view illustrating reflection of light between optical fiber and an opto-electronic device, in accordance with another embodiment of the present invention.

The hermetic assembly 110 is attached to the opening (21, 22) in the base 16 of the housing 14 of the opto-electronic module 12, with the extended portion 70 within the module housing 14. The reflective surface 113 is in optical alignment with the opto-electronic device 58. FIG. 18 illustrates a close up sectional view of the structured reflective surface region. In this embodiment, the structured reflective surface is a flat mirror surface, which reflects light 159 to/from the optical fiber 24 from/to the opto-electronic device 58. FIG. 19 is a sectional view illustrating the reflection of light between optical fiber 24 and the opto-electronic device 58 via structured reflective surface 113 at the extended portion 70, which is a concave reflective surface that reflect incident light in a converging manner.

The hermetic assembly 110 may be deemed to function as a feedthrough with built-in optics and an alignment ferrule for the optic fiber ribbon 23, eliminating the need for separate optical elements for optical coupling with the opto-electronic devices (e.g., transmitter and receiver) in the opto-electronic module 12.

The structured reflective surface 113 and the alignment grooves 134 may be formed integrally by precision stamping a ferrule out of a metal material. A precision stamping process and apparatus has been disclosed in U.S. Pat. No. 7,343,770, which was commonly assigned to the assignee of the present invention. This patent is fully incorporated by reference as if fully set forth herein. The process and stamping apparatus disclosed therein may be adapted to precision stamping the features of the ferrule 140 and/or cover 142 of the present invention (including the structured reflective surfaces and optical fiber alignment grooves). The stamping process and system can produce parts with a tolerance of at least 1000 nm.

For the hermetic assemblies described above that are configured for optical alignment/coupling to optical fibers in another fiber ribbon, the external surfaces of the hermetic assemblies should be maintained at high tolerance as well for alignment using an alignment sleeve. In the embodiments described above, no alignment pin is required for alignment of the ferrules. Accordingly, for stamping of the ferrule portions (ferrules and covers), that would include stamping the entire body of the ferrule portions, including forming the grooves, mating surfaces of the ferrule portions, and external surfaces that come into contact with sleeves. The sleeves may be precision formed by stamping as well. This maintains the required dimensional relationship between the grooves and external alignment surfaces of the hermetic assemblies, to facilitate alignment using alignment sleeves only without relying on alignment pins.

In all the above described embodiments, the structured reflective surface 113 may be configured to be flat, concave or convex, or a combination of such to structure a compound reflective surface. In one embodiment, the structured reflective surface has a smooth (polished finish) mirror surface. It may instead be a textured surface that is reflective. The structured reflective surface may have a uniform surface characteristic, or varying surface characteristics, such as varying degree of smoothness and/or textures across the surface, or a combination of various regions of smooth and textured surfaces making up the structured reflective surface. The structured reflective surface may have a surface profile and/or optical characteristic corresponding to at least one of the following equivalent optical element: mirror, focusing lens, diverging lens, diffraction grating, or a combination of the foregoing. The structure reflective surface may have a compound profile defining more than one region corresponding to a different equivalent optical element (e.g., a central region that is focusing surrounded by an annular region that is diverging). In one embodiment, the structured reflective surface is defined on an opaque material that does not transmit light through the surface.

The hermetic assemblies described in earlier embodiments may be further provided with an integral optical element in similar fashion. For example the hermetic assembly 60 in FIG. 11 may adopt an integral optical element (e.g., a stamped structured reflective surface) similar to the assembly 110.

The hermetic optical fiber alignment assembly in accordance with the present invention overcomes many of the deficiencies of the prior art, which provides precision alignment, high reliability against environmental conditions, and which can be fabricated at low cost. The inventive hermetic assembly may be configured to support a single or multiple fibers, for optical alignment and/or hermetic feedthrough that may include integral optical elements.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. An optoelectronic module assembly comprising:
a housing comprising a base portion having at least an upper surface and a lower surface, and a wall portion extending from the upper surface of the base portion defining a space within the housing;
an optoelectronic device assembly disposed in the space within the housing and on the upper surface of the base portion of the housing, the optoelectronic device assembly including at least an optoelectronic device, wherein the space being transparent to an operational wavelength of the optoelectronic device;
wherein a coupling portion of the wall portion of the housing has at least an inner surface, and an outer surface, the inner and outer surfaces of the coupling portion defining a side wall of the coupling portion;
an optical fiber alignment assembly having at least a top ferrule portion and a bottom ferrule portion facing the top ferrule portion, wherein an opening is formed in the side wall of the coupling portion of the wall portion of the housing, wherein the optical fiber alignment assembly is received in the opening of the coupling portion, wherein the optical fiber alignment assembly is inserted through the opening in the sidewall of the coupling portion of the wall portion of the housing and the top and bottom ferrule portions are hermetically sealed at the opening in the side wall of the coupling portion of the wall portion of the housing, with a portion of the top ferrule portion and the bottom ferrule portion remaining outside the housing,
wherein the optical fiber alignment assembly receives a portion of an optical fiber in the optoelectronic module assembly at a non-zero degree angle, $\alpha$, relative to an axis of the optoelectronic module assembly that is generally normal to the base portion of the housing, wherein the portion of the optical fiber that is received by the optical fiber alignment assembly is received in a groove formed in the top ferrule portion of the optical fiber alignment assembly, wherein the top ferrule portion of the optical fiber alignment assembly has a reflector at an extended portion extending beyond the bottom top ferrule portion into the space of the housing, wherein the reflector folding an optical pathway within the optoelectronic module assembly by the angle $\alpha$, the groove formed in the top ferrule portion having a length-wise axis, the portion of the optical fiber that is received in the groove formed in the top ferrule portion is disposed within the groove such that the optical axis of the portion of the optical fiber is parallel to the length-wise axis of the groove, and the reflector is disposed opposite an end of the groove, wherein light is transmitted between the reflector and the optoelectronic device without relying on any refractive optical element supported on the optical fiber alignment assembly, and a hermetic sealant hermetically attaching the top ferrule portion to the bottom ferrule potion and hermetically sealing a space around a section of the optical fiber between the top ferrule portion and the bottom ferrule portion.

2. The optoelectronic module assembly as in claim 1, wherein α ranges from approximately 70° to approximately 110° relative to the axis of the optoelectronic module assembly that is generally normal to the upper surface and lower surface of the base portion of the housing.

3. The optoelectronic module assembly of claim 2, wherein α is approximately 90°.

4. The optoelectronic module assembly of claim 1, wherein the optoelectronic device is a laser.

5. The optoelectronic module assembly of claim 1, wherein the optoelectronic device is a photodetector.

6. The optoelectronic module assembly of claim 1, wherein the top ferrule portion and the bottom ferrule portion of the optical fiber alignment assembly together comprise an exterior surface facing and coupled to the opening in the side wall of the coupling portion of the wall portion of the housing.

7. The optoelectronic module assembly of claim 1, wherein the top ferrule portion comprises a body integrally defining the reflector and the groove.

8. The optoelectronic module assembly as in claim 7, wherein the body of the top ferrule portion comprises a monolithic structure that includes the extended portion and the reflector.

9. The optoelectronic module assembly of claim 8, wherein the reflector and the groove are integrally formed on the body by stamping the malleable metal material.

10. The optoelectronic module assembly of claim 9, wherein the reflector is concave.

11. The optoelectronic module assembly of claim 10, wherein the reflector conforms to an aspheric reflective surface profile.

12. The optoelectronic module assembly of claim 11, wherein the aspheric reflective surface is structured to reshape light transmitted between an end face of the optical fiber held in the groove and the reflector without relying on a refractive optical element between the end face of the optical fiber and the structured reflective surface.

13. The optoelectronic module assembly as in claim 1, wherein the top ferrule portion defines a plurality of grooves each receiving at least an end section of an optical fiber, and a plurality of reflectors are defined at the extended portion corresponding to the plurality of grooves, wherein a cavity is defined between the top ferrule portion and the bottom ferrule portion, wherein the cavity is located partially in the top ferrule portion away from and between two ends of the top ferrule portion, wherein a suspended section of each optical fiber is suspended in the cavity and the end section of each optical fiber is supported by a corresponding groove, and wherein the cavity is sealed with the hermetic sealant that extends around the suspended section of each optical fiber within the cavity, thereby hermetically sealing the space around the suspended section of each optical fiber between the top ferrule portion and the bottom ferrule portion.

14. The optoelectronic module assembly as in claim 1, wherein light is transmitted between the reflector and the optoelectronic device without relying on any refractive optical element supported on the optical fiber alignment assembly.

15. The optoelectronic module assembly as in claim 14, wherein the reflector is structured to reshape light transmitted between an end face of the optical fiber held in the groove and the reflector without relying on any refractive optical element between the end face of the optical fiber and the structured reflective surface.

16. The opto-electronic module as in claim 15, wherein the optical fiber alignment assembly forms a terminal for external connection by an alignment sleeve.

17. A hermetic optical fiber feedthrough assembly, comprising:

a first ferrule portion having a first surface defining at least a groove receiving at least an end section of an optical fiber, wherein groove defines the location and orientation of the end section with respect to the first ferrule portion;

a second ferrule portion having a second surface facing the first surface of the first ferrule portion, wherein the first ferrule portion is hermetically attached to the second ferrule portion with the first surface towards and against the second surface to hermetically seal at least a section of the optical fiber, wherein a hermetic sealant hermetically attaching the first ferrule portion to the second ferrule potion and hermetically sealing a space around a section of the optical fiber between the first ferrule portion and the second ferrule portion, wherein the first ferrule portion includes an extended portion beyond an edge of the second ferrule portion, on which the groove extends and terminates at a reflector located beyond the edge of the second ferrule portion, wherein an end face of the optical fiber is located at a predetermined distance from the reflector along the axis of the optical fiber, and wherein the groove accurately aligns the optical fiber with respect to the reflector, so that output light from the optical fiber can be directed by the reflector in a direction away from the first surface of the first ferrule portion to outside the first ferrule portion or input light from outside the first ferrule portion incident at the reflector can be directed towards the optical fiber, wherein a cavity is defined between the first ferrule portion and the second ferrule portion, wherein the cavity is located partially in the first ferrule portion away from and between two ends of the first ferrule portion, wherein a suspended section of the optical fiber is suspended in the cavity, wherein the end section of the optical fiber is supported by the groove, and wherein the cavity is sealed with the hermetic sealant that extends around the suspended section of the optical fiber within the cavity, thereby hermetically sealing a space around the suspended section of the optical fiber between the first ferrule portion and the second ferrule portion, and wherein the hermetic optical fiber feedthrough assembly is configured as a ferrule assembly wherein top portions of the first ferrule portion and the second ferrule portion are designed to be inserted through an opening in a wall of a housing and hermetically sealed at the opening in the wall of the housing with a portion of the first ferrule portion and the second ferrule portion remaining outside the housing, said housing enclosing an optoelectronic device which receives an output light of the optical fiber from the reflector or provides an input light incident at the reflector to the optical fiber.

18. The hermetic optical fiber feedthrough assembly as in claims 17, wherein the first ferrule portion comprises a monolithic body made of a malleable metal material, and wherein the structured reflective surface and the groove are formed by stamping a malleable metal material.

19. The hermetic optical fiber feedthrough assembly as in claim 17, wherein the reflector is concave reflective.

20. A hermetically sealed optoelectronic module assembly, comprising:
   a housing having a wall with an opening; and
   a hermetic optical fiber feedthrough assembly, comprising:
      a first ferrule portion having a first surface defining at least a groove receiving at least an end section of an optical fiber, wherein groove defines the location and orientation of the end section with respect to the first ferrule portion;
      a second ferrule portion having a second surface facing and against the first surface of the first ferrule portion, wherein the first ferrule portion is hermetically attached to the second ferrule portion with the first surface towards the second surface to hermetically seal at least a section of the optical fiber, wherein a hermetic sealant hermetically attaching the first ferrule portion to the second ferrule potion and hermetically sealing a space around a section of the optical fiber between the first ferrule portion and the second ferrule portion,
      wherein the first ferrule portion includes an extended portion beyond an edge of the second ferrule portion, on which the groove extends and terminates at a reflector located beyond the edge of the second ferrule portion, wherein an end face of the optical fiber is located at a predetermined distance from the reflector along the axis of the optical fiber, and wherein the groove accurately aligns the optical fiber with respect to the reflector, so that output light from the optical fiber can be directed by the reflector in a direction away from the first surface of the first ferrule portion to outside the first ferrule portion or input light from outside the first ferrule portion incident at the reflector can be directed towards the optical fiber,
      wherein a cavity is defined between the first ferrule portion and the second ferrule portion, wherein the cavity is located partially in the first ferrule portion away from and between two ends of the first ferrule portion, wherein a suspended section of the optical fiber is suspended in the cavity, wherein the end section of the optical fiber is supported by the groove, and wherein the cavity is sealed with the hermetic sealant that extends around the suspended section of the optical fiber within the cavity, thereby hermetically sealing a space around the suspended section of the optical fiber between the first ferrule portion and the second ferrule portion,
   wherein the hermetic optical feedthrough assembly is inserted through the opening in the wall of the housing and hermetically sealed at the opening in the wall of the housing with a portion of the first ferrule portion and the second ferrule portion remaining outside the housing.

* * * * *